United States Patent
Yamaga et al.

(10) Patent No.: US 11,017,809 B2
(45) Date of Patent: *May 25, 2021

(54) MAGNETIC RECORDING MEDIUM HAVING A CONTROLLED DIMENSIONAL VARIATION

(71) Applicant: SONY CORPORATION, Tokyo (JP)

(72) Inventors: Minoru Yamaga, Tokyo (JP); Noboru Sekiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 16/454,878

(22) Filed: Jun. 27, 2019

(65) Prior Publication Data

US 2020/0312365 A1    Oct. 1, 2020

(30) Foreign Application Priority Data

Mar. 29, 2019    (JP) .............................. JP2019-067938

(51) Int. Cl.
*G11B 5/78*    (2006.01)
*G11B 5/008*    (2006.01)

(52) U.S. Cl.
CPC ............ *G11B 5/78* (2013.01); *G11B 5/00813* (2013.01)

(58) Field of Classification Search
CPC ..... G11B 5/00813; G11B 5/78; G11B 5/7253; G11B 5/7266; G11B 5/727; G11B 5/7334; G11B 5/7369; G11B 5/7379
See application file for complete search history.

(56) References Cited

U.S. PATENT DOCUMENTS

| | | | |
|---|---|---|---|
| 4,496,626 A | * | 1/1985 | Kasuga .................. G11B 5/735 360/134 |
| 6,190,753 B1 | | 2/2001 | Koseki et al. |
| 2004/0089564 A1 | | 5/2004 | Kuse et al. |
| 2004/0247859 A1 | | 12/2004 | Sasaki et al. |
| 2006/0087767 A1 | | 4/2006 | Hirai |

(Continued)

FOREIGN PATENT DOCUMENTS

| | | |
|---|---|---|
| JP | 03-185623 | 8/1991 |
| JP | H03-185623 | 8/1991 |

(Continued)

OTHER PUBLICATIONS

Japanese Decision to Grant dated Sep. 20, 2019 in corresponding Japanese Application No. 2019-067938.

(Continued)

*Primary Examiner* — Holly Rickman
*Assistant Examiner* — Linda N Chau
(74) *Attorney, Agent, or Firm* — K&L Gates LLP

(57) ABSTRACT

A magnetic recording medium includes a layer structure including a magnetic layer, a base layer, and a back layer in this order, in which an average thickness $t_T$ is $t_T \leq 5.5$ μm, a dimensional variation Δw in a width direction to tension change in a longitudinal direction is 660 ppm/N≤Δw, and a surface roughness $R_{abe}$ of the base layer on a side of the back layer is 4.2 nm≤$R_{abe}$≤8.5 nm.

29 Claims, 6 Drawing Sheets

(56) References Cited

U.S. PATENT DOCUMENTS

| | | |
|---|---|---|
| 2006/0187589 A1 | 8/2006 | Harasawa et al. |
| 2007/0230054 A1* | 10/2007 | Takeda .................. G11B 5/7305 360/134 |
| 2008/0055777 A1 | 3/2008 | Rou et al. |
| 2013/0172515 A1 | 7/2013 | Horie et al. |
| 2018/0082710 A1 | 3/2018 | Tada et al. |
| 2018/0286447 A1 | 10/2018 | Ozawa et al. |
| 2019/0180781 A1 | 6/2019 | Handa et al. |

FOREIGN PATENT DOCUMENTS

| | | |
|---|---|---|
| JP | 04-255910 | 9/1992 |
| JP | H04-255910 | 9/1992 |
| JP | 2002-210820 | 7/2002 |
| JP | 2004-005898 | 1/2004 |
| JP | 2004-030809 | 1/2004 |
| JP | 2005-199724 | 7/2005 |
| JP | 2005-222644 | 8/2005 |
| JP | 2005-276258 | 10/2005 |
| JP | 2005-285268 | 10/2005 |
| JP | 2005-332510 | 12/2005 |
| JP | 2005-346865 | 12/2005 |
| JP | 2006-099919 | 4/2006 |
| JP | 2006-107597 | 4/2006 |
| JP | 2006-216195 | 8/2006 |
| JP | 2006-228311 | 8/2006 |
| JP | 2007-042214 | 2/2007 |
| JP | 2007-250078 | 9/2007 |
| JP | 2007-294079 | 11/2007 |
| JP | 2007-305197 | 11/2007 |
| JP | 2008-159259 | 7/2008 |
| JP | 2009-087471 | 4/2009 |
| JP | 2009-223923 | 10/2009 |
| JP | 2010-218684 | 9/2010 |
| JP | 2011-150744 | 8/2011 |
| JP | 2011-181121 | 9/2011 |
| JP | 2015-135717 | 7/2015 |
| JP | 2015/198514 | 12/2015 |
| JP | 2017-139038 | 8/2017 |
| JP | 2017-191633 | 10/2017 |
| WO | WO99/29488 | 6/1999 |
| WO | 2015/198514 | 12/2015 |
| WO | 2017/085931 | 5/2017 |

OTHER PUBLICATIONS

Japanese Office Action dated Aug. 20, 2019 in corresponding Japanese Application No. 2019-067938.

Notice of Reasons for Refusal dated Aug. 15, 2019 in corresponding Japanese Application No. 2019-067938.

* cited by examiner

MAGNETIC RECORDING MEDIUM HAVING A CONTROLLED DIMENSIONAL VARIATION

CROSS REFERENCE TO RELATED APPLICATIONS

This application claims the benefit of Japanese Priority Patent Application JP 2019-067938 filed on Mar. 29, 2019, the entire contents of which are incorporated herein by reference.

TECHNICAL FIELD

The present technology relates to a magnetic recording medium.

BACKGROUND ART

In recent years, in magnetic tapes (magnetic recording media) used for computer data storage, the track width and the distance between adjacent tracks are greatly reduced for improving data recording density. Thus reduction of the track width and the distance between tracks further decreases the maximum acceptable variation as dimensional variation of the tape itself caused by environmental factors such as temperature and humidity change.

Some technologies for reducing dimensional variations have been proposed. For example, in the magnetic tape medium disclosed in Patent Literature 1, X×Y is 6×10$^5$ or more and Y/Z is 6.0 or less when X is 850 kg/mm$^2$ or more or less than 850 kg/mm$^2$, in which X is the Young's modulus of a non-magnetic support in the width direction, Y is the Young's modulus of the back layer, and Z is the Young's modulus of the layer including a magnetic layer in the width direction.

CITATION LIST

Patent Literature

[PTL 1]
JP 2005-332510A

SUMMARY

Technical Problem

It is desirable to provide a magnetic recording medium which suppresses dimensional change in the width direction by adjusting the tension applied to the tape in the longitudinal direction.

Solution to Problem

A magnetic recording medium according to an embodiment of the present technology includes
a layer structure including a magnetic layer, a base layer, and a back layer in this order,
in which an average thickness $t_T$ is $t_T$ 5.5 μm, a dimensional variation $\Delta w$ in a width direction to the tension change in a longitudinal direction is 660 ppm/N≤$\Delta w$, and
a surface roughness $R_{abe}$ of the base layer on a side of the back layer is 4.2 nm≤$R_{abe}$≤8.5 nm.

In the magnetic recording medium, a squareness ratio in a vertical direction may be 65% or more.

The dimensional variation $\Delta w$ may be 700 ppm/N≤$\Delta w$.
The dimensional variation $\Delta w$ may be 750 ppm/N≤$\Delta w$.
The dimensional variation $\Delta w$ may be 800 ppm/N≤$\Delta w$.
The surface roughness $R_{abe}$ may be 4.5 nm≤$R_{abe}$≤8.0 nm.
The surface roughness $R_{abe}$ may be 4.5 nm≤$R_{abe}$≤7.5 nm.
The surface roughness $R_{abe}$ may be 5.0 nm≤$R_{abe}$≤7.0 nm.
A surface roughness $R_{ab}$ of the back layer may be 3.0 nm≤$R_{ab}$≤7.5 nm.
A coefficient of friction μ between a surface of the magnetic recording medium on a side of the magnetic layer and a surface on the side of the back layer may be 0.20≤μ≤0.83.
The surface roughness $R_{abe}$ of the base layer on the side of the back layer may be 4.2≤$R_{abe}$≤6.8.
A surface roughness $R_{ab}$ of the back layer may be 3.0≤$R_{ab}$≤6.5.
A thermal expansion coefficient α of the magnetic recording medium may be 6 ppm/° C.≤α≤8 ppm/° C., and a humidity expansion coefficient β of the magnetic recording medium may be β≤5 ppm/% RH.
A Poisson's ratio ρ of the magnetic recording medium may be 0.3≤ρ.
An elastic limit value $\sigma_{MD}$ of the magnetic recording medium in the longitudinal direction may be 0.8 N≤$\sigma_{MD}$.
The elastic limit value $\sigma_{MD}$ may not depend on a velocity V in the measurement of elastic limit.
The magnetic layer may be vertically oriented.
An average thickness $t_b$ of the back layer may be $t_b$≤0.6 μm.

According to another embodiment of the present technology, the magnetic layer may be a sputtering layer.
In a case where the magnetic layer is a sputtering layer, an average thickness $t_m$ of the magnetic layer may be 9 nm≤$t_m$≤90 nm.
According to further embodiment of the present technology, the magnetic layer may include a magnetic powder. In a case where the magnetic layer includes a magnetic powder, the average thickness $t_m$ of the magnetic layer may be 35 nm≤$t_m$≤90 nm.
The magnetic powder may include an ε-iron oxide magnetic powder, a barium ferrite magnetic powder, a cobalt ferrite magnetic powder, or a strontium ferrite magnetic powder.

In the magnetic recording medium, the squareness ratio in the vertical direction may be 65% or more, and the surface roughness $R_{ab}$ of the back layer may be 3.0 nm≤$R_{ab}$≤7.5 nm.

In the magnetic recording medium, the squareness ratio in the vertical direction may be 65% or more, and the coefficient of friction μ between the surface of the magnetic recording medium on the magnetic layer side and the surface on the back layer side may be 0.20≤μ≤0.83.

In the magnetic recording medium, the squareness ratio in the vertical direction may be 65% or more, the surface roughness $R_{abe}$ of the base layer on the side of the back layer may be 4.2≤$R_{abe}$≤6.8, and the surface roughness $R_{ab}$ of the back layer may be 3.0≤$R_{ab}$≤6.5.

In the magnetic recording medium, the squareness ratio in the vertical direction may be 65% or more, thermal expansion coefficient α may be 6 ppm/° C.≤α9 ppm/° C., and the humidity expansion coefficient β may be β≤5.5 ppm/% RH.

In the magnetic recording medium, the squareness ratio in the vertical direction may be 65% or more, and, Poisson's ratio ρ may be 0.25≤ρ.

In the magnetic recording medium, the squareness ratio in the vertical direction may be 65% or more, and the elastic limit value $\sigma_{MD}$ in the longitudinal direction may be 0.7 N≤$\sigma_{MD}$.

In the magnetic recording medium, the squareness ratio in the vertical direction may be 65% or more, and the elastic limit value $\sigma_{MD}$ may not depend on the velocity V in the measurement of elastic limit.

DESCRIPTION OF EMBODIMENTS

Figure 1:
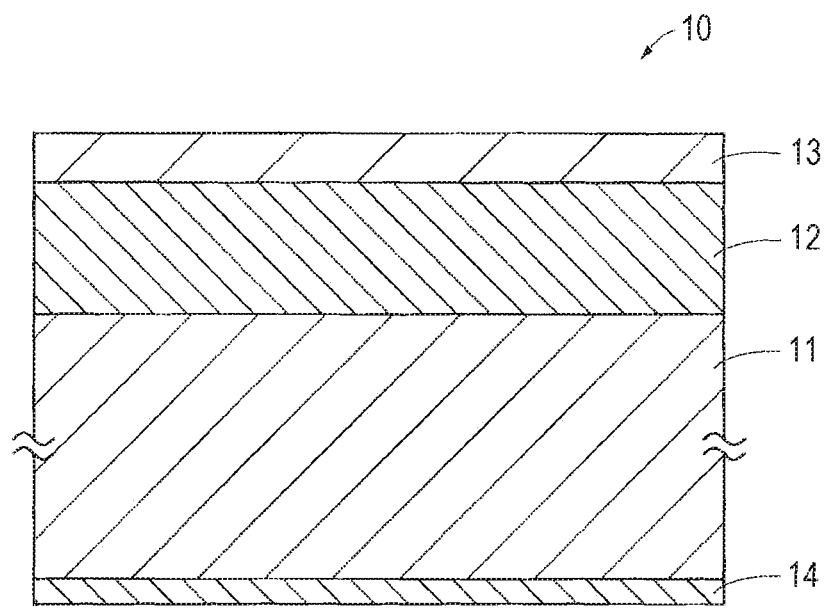
FIG. 1 is a cross sectional view depicting a configuration of a magnetic recording medium according to a first embodiment.

Favorable embodiments for performing the present technology are described below. Note that the embodiments described below represent typical embodiments of the present technology, and the scope of the present technology will not be limited only to these embodiments. The present technology is described in the following order.
1. Description of the present technology
2. First embodiment (example of magnetic recording medium of coating type)
(1) Configuration of magnetic recording medium
(2) Description of each layer
(3) Physical properties and structure
(4) Method for producing magnetic recording medium
(5) Recording and reproducing apparatus
(6) Effect
(7) Modification
3. Second embodiment (example of magnetic recording medium of vacuum thin film type)
(1) Configuration of magnetic recording medium
(2) Description of each layer
(3) Physical properties and structure
(4) Configuration of a sputtering apparatus
(5) Method for producing magnetic recording medium
(6) Effect
(7) Modification
4. Third embodiment (example of magnetic recording medium of vacuum thin film type)
5. Example 1. Description of the Present Technology There is a need to further increase the recording capacity of magnetic recording media (for example, magnetic recording tapes). For example, in order to increase the recording capacity (recording area), further thinning of a magnetic recording medium (reduction of the total thickness) for increasing the tape length per one cartridge product including a magnetic recording medium is suggested.

However, further thinning of a magnetic recording medium tends to cause dimensional change in the track width direction. The dimensional change tends to occur particularly during long-term storage. Dimensional change in the width direction can cause undesirable phenomena for magnetic recording, such as an off-track phenomenon. The off-track phenomenon means the absence of the target track at the track position to be read by a magnetic head, or reading of a wrong track position by a magnetic head.

In the past, attention was given to the suppression of dimensional change of a magnetic recording medium. Methods for suppressing the dimensional change include, for example, the addition of a layer for suppressing dimensional change of a magnetic recording medium. However, addition of the layer may increase the thickness of the magnetic recording tape, and will not increase the tape length per one cartridge product.

The inventors are studying a long magnetic recording medium suitable for use in a recording and reproducing apparatus which keeps the width of the magnetic recording medium constant or generally constant by adjusting the tension of the magnetic recording medium in the longitudinal direction. The recording and reproducing apparatus detects, for example, the dimension or dimensional change of a magnetic recording medium in the width direction, and adjusts the tension in the longitudinal direction on the basis of the detection result.

However, a magnetic recording medium with a suppressed dimensional change has a small dimensional variation in the width direction caused by tension change in the longitudinal direction. Therefore, it is difficult to keep a fixed or almost fixed width of the magnetic recording medium even if tension adjustment in the longitudinal direction is carried out with the recording and reproducing apparatus.

Additionally, further thinning of the magnetic recording tape may deteriorate handleability of the magnetic recording tape. For example, thinning of the base layer and/or the back layer of the magnetic recording tape can cause smoothing of the surface on the back layer side. The smoothing can deteriorate handleability of the magnetic recording tape, and, for example, tends to cause winding deviation of the magnetic recording tape. Therefore, adjustment of the surface roughness of the surface on the back layer side is suggested.

However, for example, if the surface on the back layer side is further roughened, the surface roughness of the surface on the magnetic layer side may be influenced during tape winding (for example, winding on a reel in a cartridge or winding into a pancake in a cutting process of tape production process), which may adversely influence electromagnetic conversion characteristic.

In consideration of the above circumstances, the inventors studied a magnetic recording medium which is thin and suitable for use in a recording and reproducing apparatus which adjusts the tension in the longitudinal direction, and has good handleability. As a result of this, the inventors have found that a magnetic recording medium having a specific configuration satisfies these requirements. More specifically, the present technology provides a magnetic recording medium having a layer structure including a magnetic layer, a base layer, and a back layer in this order, an average thickness $t_T$ of $t_T \leq 5.5$ μm, a dimensional variation Δw in the width direction to the tension change in the longitudinal direction of 660 ppm/N≤Δw, and a surface roughness $R_{abe}$ of the base layer on the back layer side of 4.2 nm≤$R_{abe}$≤8.5 nm. The average thickness $t_T$ of the magnetic recording medium according to the present technology may be 5.5 μm or less, more preferably 5.3 μm or less, and even more preferably 5.2 μm or less, 5.0 μm or less, or 4.6 μm or less. The magnetic recording medium according to the present technology is so thin that it allows, for example, the tape length wound in one magnetic recording cartridge to further increase, and this increases the recording capacity per one magnetic recording cartridge. In the magnetic recording medium according to the present technology, the dimensional variation Δw in the width direction to the tension change in the longitudinal direction may be 660 ppm/N or more, preferably 670 ppm/N or more, more preferably 700 ppm/N or more, and even more preferably 710 ppm/N or more, 730 ppm/N or more, 750 ppm/N or more, 780 ppm/N or more, or 800 ppm/N or more. The dimensional variation ΔW of the magnetic recording medium within the above-described value range contributes to allowing a fixed width of the magnetic recording medium to be kept constant by adjusting the tension of the magnetic recording medium in the longitudinal direction.

The upper limit of the dimensional variation Δw is not particularly limited, and may be, for example, 1700000 ppm/N or less, preferably 20000 ppm/N or less, more preferably 8000 ppm/N or less, and even more preferably 5000 ppm/N or less, 4000 ppm/N or less, 3000 ppm/N or less, or 2000 ppm/N or less. In a case where the dimensional variation Δw is too great, stable traveling in the production process can be difficult. The method for measuring the dimensional variation Δw is described in 2.(3).

In the magnetic recording medium according to the present technology, the surface roughness $R_{abe}$ of the base layer on the back layer side is 4.2 nm≤$R_{abe}$≤8.5 nm, more preferably 4.5 nm≤$R_{abe}$≤8.0 nm, even more preferably 4.5 nm≤$R_{abe}$≤7.5 nm, and particularly preferably 5.0 nm≤$R_{abe}$≤7.0 nm. The surface roughness $R_{abe}$ within the above-described value range improves handleability of the magnetic recording medium. For example, in a case where the magnetic recording tape is wound into a pancake or the magnetic recording tape is wound on a reel in a magnetic recording cartridge, winding deviation scarcely occurs. Additionally, in order to increase the dimensional variation Δw in the width direction to the tension change in the longitudinal direction, suggested is forming a magnetic recording medium which is more easily extended in the longitudinal direction under the same tension, or reducing the total thickness of the magnetic recording medium. The easy extension or the further thinning can decrease traveling stability due to deformation of the base layer, while traveling stability is improved by making the surface roughness $R_{abe}$ within the above-described value range. In this manner, both of improvement of traveling stability and suppression of winding deviation are achieved by making the dimensional variation Δw and surface roughness $R_{abe}$ within the above-described value ranges.

Additionally, the surface roughness $R_{abe}$ of the base layer on the back layer side is particularly preferably 4.2 nm≤$R_{abe}$≤7.0 nm, and may be 4.2 nm≤$R_{abe}$≤6.8 nm, or 4.5 nm≤$R_{abe}$≤6.5 nm. The surface roughness $R_{abe}$ within the above-described value range, particularly at the upper limit or less, achieves improvement of handleability and good electromagnetic conversion characteristic. If the surface roughness $R_{abe}$ is too high, roughness of the surface on the back layer side may adversely influence the magnetic surface during winding of the magnetic recording medium.

The method for measuring the surface roughness $R_{abe}$ is described in 2.(3) below.

The surface roughness $R_{ab}$ of the back layer of the magnetic recording medium according to the present technology is preferably 3.0 nm≤$R_{ab}$≤7.5 nm, and more preferably 3.0 nm≤$R_{ab}$≤7.3 nm. The surface roughness $R_{ab}$ within the above-described value range contributes to improvement of handleability of the magnetic recording medium.

The surface roughness $R_{ab}$ of the back layer is more preferably 7.2 nm or less, and even more preferably may be 7.0 nm or less, 6.5 nm or less, 6.3 nm or less, or 6.0 nm or less. Additionally, the surface roughness $R_{ab}$ is more preferably 3.2 nm or more, and even more preferably may be 3.4 nm or more. The surface roughness $R_{ab}$ within the above-described value range, particularly at the upper limit or less, achieves improvement of handleability and good electromagnetic conversion characteristic.

The method for measuring the surface roughness $R_{ab}$ is described in 2.(3) below.

The magnetic recording medium according to the present technology is preferably a long magnetic recording medium, and may be, for example, a magnetic recording tape (particularly a long magnetic recording tape).

The magnetic recording medium according to the present technology may include other layer in addition to a magnetic layer, a base layer, and a back layer. The other layer may be selected as appropriate according to the type of the magnetic recording medium. The magnetic recording medium according to the present technology may be, for example, a magnetic recording medium of coating type or a magnetic recording medium of vacuum thin film type. The magnetic recording medium of coating type is further described in detail in 2 below. The magnetic recording medium of vacuum thin film type is further described in detail in 3 and 4 below. See these descriptions for details about the layer other than these three layers included in the magnetic recording medium. The magnetic recording medium according to the present technology may include, for example, at least one data band and at least two servo bands. The number of the data bands may be, for example, two to ten, particularly three to six, and more particularly four or five. The number of the servo bands may be, for example, three to 11, particularly four to seven, and more particularly five or six. These servo bands and data bands may be arranged, for example, so as to extend in the longitudinal direction of, particularly in a generally parallel, to a long magnetic recording medium (particularly a magnetic recording tape). The data band and the servo bands may be provided on the magnetic layer. Examples of the magnetic recording medium having the data band and the servo bands include magnetic recording tapes in conformity with the linear tape-open (LTO) specification. More specifically, the magnetic recording medium according to the present technology may be a magnetic recording tape in conformity with the LTO specification. For example, the magnetic recording medium according to the present technology may be a magnetic recording tape in conformity with the LTO8 or later specifications (for example LTO9, LTO10, LTO11, or LTO12).

The width of the long magnetic recording medium (particularly magnetic recording tape) according to the present technology may be, for example 5 mm to 30 mm, particularly 7 mm to 25 mm, more particularly 10 mm to 20 mm, and even more particularly 11 mm to 19 mm. The length of the long magnetic recording medium (particularly magnetic recording tape) may be, for example, 500 m to 1500 m. For example, the tape width and the tape length according to the LTO8 specification are 12.65 mm and 960 m, respectively.

2. First Embodiment (Example of Magnetic Recording Medium of Coating Type)

(1) Configuration of Magnetic Recording Medium

Firstly, with reference to FIG. 1, the configuration of a magnetic recording medium 10 according to the first embodiment is described. The magnetic recording medium 10 is, for example, a magnetic recording medium which has been subjected to vertical orienting treatment, and includes, as depicted in FIG. 1, a long base layer (may be referred to as a matrix) 11, a primary layer (non-magnetic layer) 12 provided on one main surface of the base layer 11, a magnetic layer (may be referred to as a recording layer) 13 provided on the primary layer 12, and a back layer 14 provided on the other main surface of the base layer 11. Of the main surfaces of the magnetic recording medium 10, the surface having the magnetic layer 13 is referred to as a magnetic surface, and the surface opposite to the magnetic surface (the surface having the back layer 14) is referred to as a back surface.

The magnetic recording medium 10 is long, and traveled in the longitudinal direction during recording and reproducing. Additionally, the magnetic recording medium 10 may be configured so as to record a signal at the shortest recording wavelength of preferably 100 nm or less, more preferably 75 nm or less, even more preferably 60 nm or less, and particularly preferably 50 nm or less, and may be used in, for example, a recording and reproducing apparatus in which the shortest recording wavelength is within the above-described range. The recording and reproducing apparatus may include a ring-shaped head as a recording head. The recording track width is, for example 2 μm or less.

(2) Description of Each Layer
(Base Layer)

The base layer 11 can work as a support of the magnetic recording medium 10, and may be, for example, a flexible long non-magnetic matrix, particularly a non-magnetic film. The thickness of the base layer 11 may be, for example, 2 μm or more 8 μm or less, preferably 2.2 μm or more 7 μm or less, more preferably 2.5 μm or more 6 μm or less, and even more preferably 2.6 μm or more 5 μm or less. The base layer 11 may include at least one of, for example, polyester resins, polyolefin resins, cellulose derivatives, vinyl resins, aromatic polyether ketone resins, or other polymer resins. In a case where the base layer 11 includes two or more of the above materials, these two or more materials may be mixed, copolymerized, or laminated.

Examples of the polyester resin include polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxy carboxylate, which may be used alone or in combination of two or more of them. According to a preferred embodiment of the present technology, the base layer 11 may include PET or PEN. Examples of the polyolefin resin include polyethylene (PE) and polypropylene (PP), which may be used alone or in combination of two or more of them.

Examples of the cellulose derivative include cellulose diacetate, cellulose triacetate, cellulose acetate butylate (CAB), and cellulose acetate propionate (CAP), which may be used alone or in combination of two or more of them.

Examples of the vinyl resin include polyvinyl chloride (PVC) and polyvinylidene chloride (PVDC), which may be used alone or in combination of two or more of them. Examples of the aromatic polyether ketone resin include polyether ketone (PEK), polyether ether ketone (PEEK), polyether ketone (PEKK), and polyether ether ketone (PEEKK), which may be used alone or in combination of two or more of them. According to a preferred embodiment of the present technology, the base layer 11 may include PEEK.

Examples of the other polymer resin include polyamide ((PA), nylon), aromatic PA (aromatic polyamide, aramid), polyimide (PI), aromatic PI (aromatic polyimide), polyamide imide (PAI), aromatic PAI (aromatic polyamide imide), polybenzoxazole ((PBO), for example ZYLON (registered trademark)), polyether, polyether ester, polyether sulfone (PES), polyether imide (PEI), polysulfone (PSF), polyphenylene sulfide (PPS), polycarbonate (PC), polyarylate (PAR), and polyurethane (PU), which may be used alone or in combination of two or more of them.

(Magnetic Layer)

The magnetic layer 13 may be, for example, a vertical recording layer. The magnetic layer 13 may include a magnetic powder. The magnetic layer 13 may further include, in addition to the magnetic powder, for example, a binder and conductive particles. The magnetic layer 13 may further include, as necessary, additives such as a lubricant, an abrasive, and a rust-preventive agent.

The average thickness $t_m$ of the magnetic layer 13 may be preferably 35 nm≤$t_m$≤120 nm, more preferably 35 nm≤$t_m$≤100 nm, and particularly preferably 35 nm≤$t_m$≤90 nm. The average thickness $t_m$ of the magnetic layer 13 within the above-described value range contributes to improvement of the electromagnetic conversion characteristic.

The average thickness $t_m$ of the magnetic layer 13 is determined as follows. Firstly, the magnetic recording medium 10 is thinly processed perpendicularly to its main surface to make a sample piece, and a cross section of the test piece is observed with a transmission electron microscope (TEM) under the following conditions.
Apparatus: TEM (Hitachi, Ltd., H9000NAR)
Accelerating voltage: 300 kV
Magnification: 100,000 times Subsequently, using the TEM image thus obtained, the thickness of the magnetic layer 13 is measured at least ten points in the longitudinal direction of the magnetic recording medium 10, and then these measurement values are simply averaged (arithmetically averaged) to obtain the average thickness $t_m$ (nm) of the magnetic layer 13. The magnetic layer 13 is preferably a vertically oriented magnetic layer. In the present description, vertical orientation means that the squareness ratio S1 measured in the longitudinal direction (traveling direction) of the magnetic recording medium 10 is 35% or less. The method for measuring the squareness ratio S1 is described below.

Note that the magnetic layer 13 may be an in-plane oriented (longitudinally oriented) magnetic layer. More specifically, the magnetic recording medium 10 may be a magnetic recording medium of horizontal recording type. However, vertical orientation is more preferred for achieving a high recording density.

(Magnetic Powder)

Examples of the magnetic particles composing the magnetic powder included in the magnetic layer 13 include, but not limited to, an epsilon iron oxide (s-iron oxide), gamma hematite, magnetite, chromium dioxide, cobalt-doped iron oxide, hexagonal ferrite, barium ferrite (BaFe), Co ferrite, strontium ferrite, and metal. The magnetic powder may be one of them or a combination of two or more of them. Particularly preferably, the magnetic powder may include an ε-iron oxide magnetic powder, a barium ferrite magnetic powder, a cobalt ferrite magnetic powder, or a strontium ferrite magnetic powder. Note that the ε-iron oxide may include Ga and/or Al. These magnetic particles may be selected as appropriate by those skilled in the art on the basis of factors, for example, the method for producing the magnetic layer 13, the specification of the tape, and the function of the tape.

The average particle size (average maximum particle size) D of the magnetic powder may be preferably 22 nm or less, more preferably 8 nm or more and 22 nm or less, and even more preferably 10 nm or more and 20 nm or less.

The average particle size D of the magnetic powder is determined as follows. Firstly, the magnetic recording medium 10 to be measured is processed by, for example, the focused ion beam (FIB) method to make a slice, and a cross section of the slice is observed with a TEM. Subsequently, 500 ε-iron oxide particles are randomly selected from the TEM photograph thus shot, the maximum particle size $d_{max}$ of each particle is measured, thereby determining the particle size distribution of the maximum particle size $d_{max}$ of the magnetic powder. The term "maximum particle size $d_{max}$" means the so-called maximum Feret diameter, specifically, refers to the maximum one of the distances between two parallel lines drawn at every angle so as to be in contact with the contour of ε-iron oxide particles. Thereafter, the median diameter (50% diameter, D50) of the maximum particle size $d_{max}$ is determined from the particle size distribution of the maximum particle size $d_{max}$ thus determined, and recorded as the average particle size (average maximum particle size) D of the magnetic powder.

The shape of the magnetic particles depends on the crystal structure of the magnetic particles. For example, BaFe and strontium ferrite may have a hexagonal plate shape. ε-iron oxide may have a spherical shape. Cobalt ferrite may have a cubic shape. Metal may have a spindle shape. These magnetic particles are oriented in the production process of the magnetic recording medium 10.

According to a preferred embodiment of the present technology, the magnetic powder may preferably include the powder of nanoparticles including ε-iron oxide (hereinafter referred to as "ε-iron oxide particles"). ε-iron oxide particles can achieve high coercivity even in the form of fine particles. The ε-iron oxide included in ε-iron oxide particles is preferably preferentially crystal-oriented in the thickness direction (vertical direction) of the magnetic recording medium 10.

The ε-iron oxide particles have a spherical or generally spherical shape, or a cubic or generally cubic shape. Since the ε-iron oxide particles have the above-described shape, in a case where ε-iron oxide particles are used as magnetic particles, the contact area between particles in the thickness direction of the medium is reduced in comparison with the case where hexagonal lamellar barium ferrite particles are used as magnetic particles, and thus flocculation of particles is suppressed.

Accordingly, dispersibility of the magnetic powder is increased, and better signal-to-noise ratio (SNR) is obtained.

Figure 2:
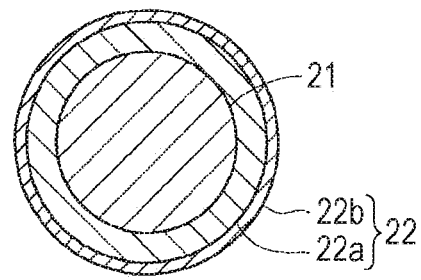
FIG. 2 is a cross sectional view depicting a configuration of magnetic particles.

The ε-iron oxide particles have a core-shell structure. Specifically, the ε-iron oxide particles include, as depicted in FIG. 2, a core 21, and a shell 22 with a two-layer structure formed around the core 21. The shell 22 with a two-layer structure includes a first shell 22a provided on the core 21, and a second shell 22b provided on the first shell 22a.

The core 21 includes ε-iron oxide. The ε-iron oxide included in the core 21 preferably includes ε-$Fe_2O_3$ crystals as the main phase, and more preferably includes ε-$Fe_2O_3$ of single phase.

The first shell 22a covers at least a portion of the periphery of the core 21. Specifically, the first shell 22a may partially cover the periphery of the core 21, or the entire periphery of the core 21. It is preferred that the entire surface of the core 21 be covered for achieving sufficient exchange coupling between the core 21 and the first shell 22a, and improving the magnetic characteristic.

The first shell 22a is a so-called soft magnetic layer, and may include, for example, a soft magnetic substance such as α-Fe, Ni—Fe alloy, or Fe—Si—Al alloy. α-Fe may be obtained by reducing ε-iron oxide included in the core 21.

The second shell 22b is an oxide film as an oxidation preventive layer. The second shell 22b may include α-iron oxide, aluminum oxide, or silicon oxide. The α-iron oxide may include, for example, at least one iron oxide of $Fe_3O_4$, $Fe_2O_3$, and FeO. In a case where the first shell 22a includes α-Fe (soft magnetic substance), the α-iron oxide may be obtained by oxidizing α-Fe included in the first shell 22a.

Inclusion of the first shell 22a in the ε-iron oxide particles as described above allows achievement of thermal stability, and thus this keeps the coercivity Hc of the core 21 alone at a high value and/or adjusts the coercivity Hc of the entire ε-iron oxide particles (core-shell particles) at the coercivity Hc suitable for recording. Additionally, Inclusion of the second shell 22b in the ε-iron oxide particles as described above suppresses the deterioration in characteristics of the ε-iron oxide particles caused by rust on the particle surface generated by exposure of the ε-iron oxide particles to air during and before the production process of the magnetic recording medium 10. Accordingly, deterioration of characteristics of the magnetic recording medium 10 is suppressed.

Figure 6:
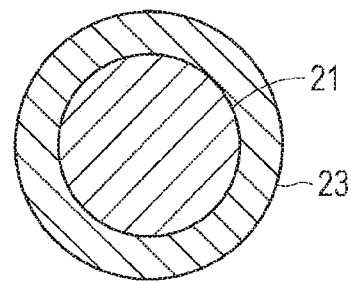
FIG. 6 is a cross sectional view depicting a configuration of magnetic particles according to a modification.

The ε-iron oxide particles may include, as depicted in FIG. 6, a shell 23 with a monolayer structure. In this case, the shell 23 has a configuration similar to the first shell 22a. However, from the viewpoint of suppressing deterioration of characteristics of the ε-iron oxide particles, the ε-iron oxide particles more preferably include a shell 22 having a two-layer structure.

The ε-iron oxide particles may include an additive in place of a core-shell structure, or may include an additive besides a core-shell structure. In these cases, a portion of Fe of the ε-iron oxide particles is substituted with the additive. The inclusion of an additive in the ε-iron oxide particles adjusts the coercivity Hc of the entire ε-iron oxide particles to the coercivity Hc suitable for recording, and thus improves recording easiness. The additive is a metal element other than iron, preferably a trivalent metal element, more preferably at least one selected from the group including aluminum (Al), gallium (Ga), and indium (In). Specifically, the ε-iron oxide including an additive is ε-$Fe_{2-x}M_xO_3$ crystal (in which M is a metal element other than iron, preferably a trivalent metal element, more preferably at least one selected from the group including Al, Ga, and In; x is, for example, 0<x<1).

According to another preferred embodiment of the present technology, the magnetic powder may be a barium ferrite (BaFe) magnetic powder. The barium ferrite magnetic powder includes magnetic particles of iron oxide including barium ferrite as the main phase (hereinafter referred to as "barium ferrite particles"). The barium ferrite magnetic powder has high reliability of data recording, for example, retention of antimagnetic force even in a high temperature and high humidity environment. From these viewpoints, the barium ferrite magnetic powder is preferred as the magnetic powder.

The average particle size of the barium ferrite magnetic powder is 50 nm or less, more preferably 10 nm or more and 40 nm or less, and even more preferably 12 nm or more and 25 nm or less.

In a case where the magnetic layer 13 includes a barium ferrite magnetic powder as a magnetic powder, the average thickness $t_m$ [nm] of the magnetic layer 13 is preferably 35 nm≤$t_m$≤100 nm. In addition, the coercivity Hc of the magnetic recording medium 10 measured in the thickness direction (vertical direction) is preferably 160 kA/m or more and 280 kA/m or less, more preferably 165 kA/m or more and 275 kA/m or less, and even more preferably 170 kA/m or more and 270 kA/m or less. According to a more preferred other embodiment of the present technology, the magnetic powder may be a cobalt ferrite magnetic powder. The cobalt ferrite magnetic powder includes magnetic particles of iron oxide including cobalt ferrite as the main phase (hereinafter referred to as "cobalt ferrite magnetic particles"). The cobalt ferrite magnetic particles preferably has uniaxial anisotropy. The cobalt ferrite magnetic particles have, for example, a cubic or generally cubic shape. The cobalt ferrite includes Co. The cobalt ferrite may further include, in addition to Co, at least one selected from the group including Ni, Mn, Al, Cu, and Zn.

The cobalt ferrite has the average composition represented by, for example, the following formula (1).

$$Co_xMyFe_2O_z \qquad (1)$$

(In the formula (1), M is, for example, at least one metal selected from the group including Ni, Mn, Al, Cu, and Zn; x is a value within the range of 0.4≤x≤1.0. y is a value within the range of 0≤y≤0.3; x and y satisfy the relationship (x+y)≤1.0; z is a value within the range of 3≤z≤4; a portion of Fe may be substituted with other metal element.)

The average particle size of the cobalt ferrite magnetic powder is preferably 25 nm or less, and more preferably 23 nm or less. The coercivity Hc of the cobalt ferrite magnetic powder is preferably 2500 Oe or more, and more preferably 2600 Oe or more and 3500 Oe or less.

According to more preferred other embodiment of the present technology, the magnetic powder may include the powder of nanoparticles of hexagonal ferrite (hereinafter referred to as "hexagonal ferrite particles"). The hexagonal ferrite particles include, for example, hexagonal plate-shaped or generally hexagonal plate-shaped. The hexagonal ferrite preferably includes at least one of Ba, Sr, Pb, or Ca, and more preferably at least one of Ba or Sr. The hexagonal ferrite may be, specifically, for example, barium ferrite or strontium ferrite. The barium ferrite may further include, in addition to Ba, at least one of Sr, Pb, or Ca. The strontium ferrite may further include, in addition to Sr, at least one of Ba, Pb, or Ca.

More specifically, the hexagonal ferrite may have an average composition represented by the general formula $MFe_{12}O_{19}$, in which M is, for example, at least one metal of Ba, Sr, Pb, or Ca, and preferably at least one metal of Ba or Sr. The M may be a combination of Ba and at least one metal selected from the group including Sr, Pb, and Ca. Furthermore, the M may be a combination of Sr and at least one metal selected from the group including Ba, Pb, and Ca. In the general formula, a portion of Fe may be substituted with other metal element.

In a case where the magnetic powder includes the powder of hexagonal ferrite particles, the average particle size of the magnetic powder is preferably 50 nm or less, more preferably 10 nm or more and 40 nm or less, and even more preferably 15 nm or more and 30 nm or less.

(Binder)

The binder is preferably, for example, a polyurethane resin or a vinyl chloride resin subjected to crosslinking reaction. However, the binder will not be limited to them, and may include other resin as appropriate according to the physical properties which may be required of the magnetic recording medium 10. The resin to be included will not be particularly limited as long as it is usually used in the magnetic recording medium 10 of coating type.

Examples of the binder include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butylate, cellulose diacetate, cellulose triacetate, cellulose propionate, and nitrocellulose), a styrene butadiene copolymer, a polyester resin, an amino resin, and synthetic rubber.

Additionally, the binder may be a thermosetting resin or a reactive resin, and examples of them include a phenolic resin, an epoxy resin, an urea resin, a melamine resin, an alkyd resin, a silicone resin, a polyamine resin, and an urea formaldehyde resin.

Additionally, the above-listed binders may include a polar functional group such as —$SO_3M$, —$OSO_3M$, —COOM, $P=O(OM)_2$ for the purpose of improving dispersibility of the magnetic powder. Here, in the formula, M is a hydrogen atom, or an alkali metal such as lithium, potassium, and sodium.

Additionally, examples of the polar functional group include those of side chain type having end groups —NR1R2 and —NR1R2R3$^+$X$^-$, and those of main chain type having >NR1R2$^+$X$^-$.

Here, in the formula, R1, R2, and R3 are hydrogen atoms or hydrocarbon groups, and X$^-$ is a halogen element ion such as fluorine, chlorine, bromine, or iodine, or an inorganic or organic ion. Additionally, examples of the polar functional group include —OH, —SH, —CN, and an epoxy group.

(Additive) The magnetic layer 13 may further include, as non-magnetic reinforcing particles, aluminum oxide (α, β, or γ-alumina), chromic oxide, silicon oxide, diamond, garnet, emery, boron nitride, titanium carbide, silicon carbide, titanium carbide, titanium oxide (rutile type or anatase type titanium oxide).

(Primary layer)

The primary layer 12 is a non-magnetic layer including a non-magnetic powder and a binder as main ingredients.

The description about the binder included in the magnetic layer 13 also holds true for the binder included in the primary layer 12. The primary layer 12 may further include, as necessary, at least one additive such as conductive particles, a lubricant, a curing agent, and a rust-preventive agent.

The average thickness of the primary layer 12 is preferably 0.6 μm or more and 2.0 μm or less, more preferably 0.8 μm or more and 1.4 μm or less. Note that the average thickness of the primary layer 12 is determined in a manner similar to the average thickness $t_m$ of the magnetic layer 13. However, the magnification of the TEM image is appropriately adjusted according to the thickness of the primary layer 12.

(Non-Magnetic Powder)

The non-magnetic powder included in the primary layer 12 may include, for example, at least one selected from inorganic particles and organic particles. One kind of non-magnetic powder may be used alone, or a combination of two or more kinds of non-magnetic powder may be used. The inorganic particles include, for example, one or a combination of two or more selected from metal, metal oxide, metal carbonate, metal sulfate, metal nitride, metal carbide, and metal sulfide. More specifically, the inorganic particles may be, for example, one or more selected from iron oxyhydroxide, hematite, titanium oxide, and carbon black. Examples of the shape of the non-magnetic powder include, but not particularly limited to, various shapes such as a needle shape, a spherical shape, a cubic shape, and a plate shape.

(Back Layer)

The back layer 14 may include a binder and a non-magnetic powder. The back layer 14 may include, as necessary, various additives such as a lubricant, a curing agent, and an antistatic agent. The statements about the binder and the non-magnetic powder included in the primary layer 12 apply to the binder and the non-magnetic powder included in the back layer 14.

The average particle size of the inorganic particles included in the back layer 14 is preferably 10 nm or more and 150 nm or less, and more preferably 15 nm or more and 110 nm or less. The average particle size of the inorganic particles can be determined in a manner similar to the average particle size D of the magnetic powder.

The average thickness $t_b$ of the back layer 14 is preferably $t_b \leq 0.6$ μm. The average thickness $t_b$ of the back layer 14 within the above-described range allows the thicknesses of the primary layer 12 and the base layer 11 to be kept high even if the average thickness $t_T$ of the magnetic recording medium 10 is $t_T \leq 5.5$ μm, and this maintains traveling stability of the magnetic recording medium 10 in a recording and reproducing apparatus.

The average thickness $t_b$ of the back layer 14 is determined as follows. Firstly, the magnetic recording medium 10 with a width of ½ inches is provided, cut into a piece with a length of 250 mm, thus making a sample. Subsequently, using Mitsutoyo Laser Hologage as a measuring apparatus, the thickness of the sample is measured at different five points, and these measurement values are simply averaged (arithmetically averaged), thereby calculating the average $t_T$ [μm]. Subsequently, the back layer 14 of the sample is removed with a solvent such as methyl ethyl ketone (MEK) or dilute hydrochloric acid, and then the thickness of the sample is measured again at different five points using the above-described Laser Hologage, and these measurement values are simply averaged (arithmetically averaged), thereby calculating the average $t_B$ [μm]. Subsequently, the average thickness $t_b$ of the back layer 14 (μm) is determined by the following formula.

$$t_b [\mu m] = t_T [\mu m] - t_B [\mu m]$$

(3) Physical Properties and Structure (Average Thickness $t_T$ of Magnetic Recording Medium)

The average thickness $t_T$ of the magnetic recording medium 10 is $t_T \leq 5.5$ μm. If the average thickness $t_T$ of the magnetic recording medium 10 is $t_T \leq 5.5$ μm, the recording capacity of one data cartridge is increased from that of related art. The lower limit of the average thickness $t_T$ of the magnetic recording medium 10 is not particularly limited, and is, for example, 3.5 [μm] $\leq t_T$. The average thickness $t_T$ of the magnetic recording medium 10 is determined by the method for measuring the average $t_T$, which has been described in the method for measuring the average thickness $t_b$ of the back layer 14.

(Dimensional Variation Δw)

The dimensional variation Δw [ppm/N] of the magnetic recording medium 10 in the width direction to the tension change of the magnetic recording medium 10 in the longitudinal direction is 660 ppm/N≤Δw, preferably 670 ppm/N≤Δw, more preferably 680 ppm/N≤Δw, more preferably 700 ppm/N≤Δw, even more preferably 750 ppm/N≤Δw, and particularly preferably 800 ppm/N≤Δw. If the dimensional variation Δw is Δw<660 ppm/N, control of the width change by tension adjustment in the longitudinal direction with the recording and reproducing apparatus may be difficult. The upper limit of the dimensional variation Δw is not particularly limited, and may be, for example, Δw≤1700000 ppm/N, preferably Δw≤20000 ppm/N, more preferably Δw≤8000 ppm/N, and even more preferably Δw≤5000 ppm/N. Δw≤4000 ppm/N, Δw≤3000 ppm/N, or Δw≤2000 ppm/N.

Those skilled in the art can establish the dimensional variation Δw as appropriate. For example, the dimensional variation Δw may be established at a desired value by selecting the thickness of the base layer 11 and/or the material of the base layer 11. Alternatively, the dimensional variation Δw may be set at a desired value by, for example, adjusting the stretch strength in the longitudinal and lateral directions of the film composing the base layer. For example, strong drawing in the width direction further decrease the Δw, while enhancement of drawing in the longitudinal direction increases the Δw.

The dimensional variation Δw is determined as follows. Firstly, the magnetic recording medium 10 having a width of ½ inches is provided, cut into a piece having a length of 250 mm, thus making a sample 10S. Secondly, loads of 0.2 N, 0.6 N, and 1.0 N are applied in this order to the sample 10S in the longitudinal direction, and the width of the sample 10S is measured under the loads of 0.2 N, 0.6 N, and 1.0 N. Subsequently, the dimensional variation Δw is determined by the following formula. Note that the measurement under application of a load of 0.6 N is carried out for confirming that no abnormality occurred in the measurement (particularly, for confirming that these three measurement results are linear), and the measurement result is not used in the following formula.

[Math. 1]

$$\Delta w \ [ppm/N] = \frac{D(0.2N)[mm] - D(1.0N)[mm]}{D(0.2N)[mm]} \times \frac{1,000,000}{(1.0[N]) - (0.2[N])}$$

(Note that in the formula, D(0.2 N) and D(1.0 N) represent the widths of the sample 10S subjected to loads of 0.2 N and 1.0 N, respectively, in the longitudinal direction of the sample 10S.)

Figure 3A:
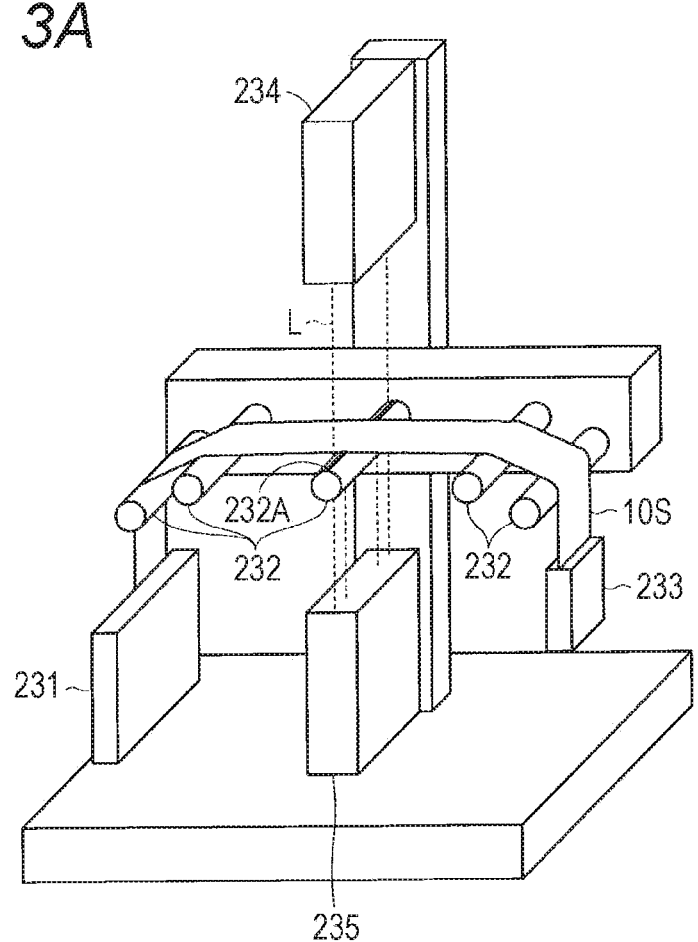
FIG. 3A is a perspective view depicting a configuration of a measuring apparatus.

The width of the sample 10S subjected to each load is measured as follows. Firstly, as measuring apparatus, the measuring apparatus depicted in FIG. 3A including the digital dimension measuring instrument LS-7000 manufactured by KEYENCE CORPORATION is provided, and the sample 10S is mounted on the measuring apparatus. Specifically, one end of the long sample (magnetic recording medium) 10S is fixed by a fixing unit 231. Subsequently, as depicted in FIG. 3A, the sample 10S is mounted on five generally columnar and rod-like support members 232. The sample 10S is mounted on these supports in such a manner that the back surface is in contact with the five support members 232. All of the five support members 232 (particularly their surfaces) include stainless steel SUS304, and their surface roughness Rz (maximum height) is 0.15 μm to 0.3 μm.

Figure 3B:
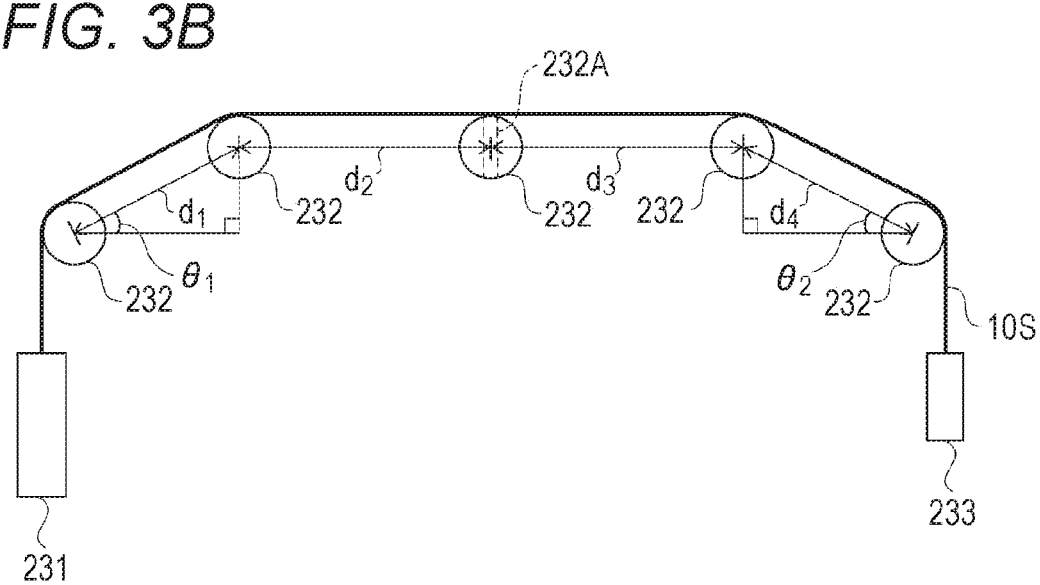
FIG. 3B is a schematic view depicting a detail of a measuring apparatus.

The arrangement of the five rod-like support members 232 is described with reference to FIG. 3B. As depicted in FIG. 3B, the sample 10S is mounted on the five support members 232. The five support members 232 are referred to as, from the one nearest to the fixing unit 231, "first support member", "second support member", "third support member" (having a slit 232A), "fourth support member", and "fifth support member" (closest to a weight 233). The diameter of these five support members is 7 mm. The distance $d_1$ between the first support member and the second support member (particularly the distance between the centers of these support members) is 20 mm. The distance $d_2$ between the second support member and the third support member is 30 mm. The distance $d_3$ between the third support member and the fourth support member is 30 mm. The distance $d_4$ between the fourth support member and the fifth support member is 20 mm. Additionally, in the sample 10S, the second support member, the third support member, and the fourth support member are arranged in such a manner that the portions mounted on the position between the second support member, the third support member, and the fourth support member form a flat surface generally perpendicular to the direction of gravitational force. Additionally, the first support member and the second support member are arranged in such a manner that the sample 10S forms an angle of $\theta_1=30°$ to the generally vertical flat surface between the first support member and the second support member.

Furthermore, the fourth support member and the fifth support member are arranged in such a manner that the sample 10S forms an angle of $\theta_2=30°$ to the generally vertical flat surface between the fourth support member and the fifth support member.

Additionally, of the five support members 232, the third support member is fixed so as not to rotate, but all of the other four support members are rotatable.

The sample 10S is held on the support members 232 so as not to move in the width direction of the sample 10S.

Note that, of the support members 232, the support member 232, which is located between a light emitter 234 and a light receiver 235, and at the almost middle of the fixing unit 231 and the loading unit, has the slit 232A. Light L is emitted from the light emitter 234 to the light receiver 235 through the slit 232A. The slit width of the slit 232A is 1 mm, and the light L passes through the width without being blocked by the frame of the slit 232A.

Subsequently, the measuring apparatus is placed in a chamber controlled at a constant environment having a temperature of 25° C. and a relative humidity of 50%, the weight 233 for applying a load of 0.2 N is attached to the other end of the sample 10S, and then the sample 10S is allowed to stand in the environment for two hours. After standing for two hours, the width of the sample 10S is measured. Subsequently, the weight for applying a load of 0.2 N is replaced with a weight for applying a load of 0.6 N, and the width of the sample 10S is measured five minutes after the replacement. Finally, the weight is replaced with a weight for applying a load of 1.0 N, and the width of the sample 10S is measured five minutes after the replacement.

As described above, the load applied to the longitudinal direction of the sample 10S can be changed by adjusting the weight of the weight 233. The light L is emitted from the light emitter 234 to the light receiver 235 with each load applied, and the width of the sample 10S subjected to the load in the longitudinal direction is measured. Measurement of the width is carried out in a condition where the sample 10S is not curled. The light emitter 234 and the light receiver 235 are included in the digital dimension measuring instrument LS-7000.

(Thermal Expansion Coefficient α)

The thermal expansion coefficient α [ppm/° C.] of the magnetic recording medium 10 may be preferably 5.5 ppm/° C.≤α≤9 ppm/° C., and more preferably 5.9 ppm/° C.≤α≤8 ppm/° C. The thermal expansion coefficient α within the above-described range allows the width change of the magnetic recording medium 10 to be further suppressed through the adjustment of the tension of the magnetic recording medium 10 in the longitudinal direction with a recording and reproducing apparatus.

The thermal expansion coefficient α can be determined as follows. Firstly, a sample 10S is made in a manner similar to the method for measuring the dimensional variation Δw, the sample 10S is mounted on a measuring apparatus similar to that used in the method for measuring the dimensional variation Δw, and the measuring apparatus is placed in a chamber having a constant environment with a temperature of 29° C. and a relative humidity of 24%. Secondly, a load of 0.2 N is applied to the sample 10S in the longitudinal direction, and the sample 10S is allowed to stand in the environment for two hours. Thereafter, with the relative humidity kept at 24%, the temperature is changed to 45° C., 29° C., and 10° C. in this order, the width of the sample 10S is measured at 45° C., 29° C., and 10° C., and the thermal expansion coefficient α is determined by the following formula.

The measurement at these temperatures is carried out two hours after reaching each temperature. Note that the measurement at a temperature of 29° C. is carried out for confirming that no abnormality occurred in the measurement (particularly, for confirming that these three measurement results are linear), and the measurement result is not used in the following formula.

[Math. 2]

$$\alpha \text{ [ppm/° C.]} = \frac{D(45° \text{ C.})[\text{mm}] - D(10° \text{ C.})[\text{mm}]}{D(10° \text{ C.})[\text{mm}]} \times \frac{1{,}000{,}000}{(45[° \text{ C.}]) - (10[° \text{ C.}])}$$

(Note that in the formula, D(45° C.) and D(10° C.) represent the widths of the sample 10S at the temperatures of 45° C. and 10° C., respectively.)

(Humidity Expansion Coefficient β)

The humidity expansion coefficient β [ppm/% RH] of the magnetic recording medium 10 may be preferably β≤5.5 ppm/% RH, more preferably β≤5.2 ppm/% RH, and even more preferably β≤5.0 ppm/% RH. The humidity expansion coefficient β within the above-described range further suppresses the width change of the magnetic recording medium 10 through adjustment of the tension of the magnetic recording medium 10 in the longitudinal direction with a recording and reproducing apparatus. The humidity expansion coefficient β is determined as follows. Firstly, a sample 10S is made in a manner similar to the method for measuring dimensional variation Ow, and the sample 10S is mounted on a measuring apparatus similar to that used in the method for measuring dimensional variation Δw, and then the measuring apparatus is placed in a chamber controlled at a constant environment having a temperature of 29° C. and a relative humidity of 24%. Subsequently, a load of 0.2 N is applied to the sample 10S in the longitudinal direction, and the sample is placed in this environment for two hours. Thereafter, the relative humidity is changed to 80%, 24%, and 10% in this order with the temperature kept at 29° C., the width of the sample 10S is measured at the relative humidities of 80%, 24%, and 10%, and the humidity expansion coefficient β is determined by the following formula. The measurement at these humidity values is carried out immediately after each temperature is attained. Note that the measurement at humidity of 24% is carried out for confirming that no abnormality occurred in the measurement, and its measurement result is not used in the following formula.

[Math. 3]

$$\beta \text{ [ppm/\% RH]} = \frac{D(80\%)\text{[mm]} - D(10\%)\text{[mm]}}{D(10\%)\text{[mm]}} \times \frac{1{,}000{,}000}{(80[\%]) - (10[\%])}$$

(Note that in the formula, D(80%) and D(10%) represent the widths of the sample 10S at the humidities of 80% and 10%, respectively)

(Poisson's Ratio ρ)

The Poisson's ratio ρ of the magnetic recording medium 10 may be preferably 0.25≤ρ, more preferably 0.29≤ρ, and even more preferably 0.3≤ρ. If the Poisson's ratio ρ is within the above-described range, width change of the magnetic recording medium 10 through the adjustment of the tension of the magnetic recording medium 10 in the longitudinal direction with a recording and reproducing apparatus is facilitated.

The Poisson's ratio ρ is determined as follows. Firstly, a magnetic recording medium 10 having a width of ½ inches is provided, cut into a piece having a length of 150 mm to make a sample, and then a mark with a size of 6 mm×6 mm is made at the center of the sample.

Subsequently, both the ends of the sample in the longitudinal direction are chucked in such a manner that the distance between the chucks is 100 mm, an initial load of 2 N is applied. At this time, the mark length on the sample in the longitudinal direction is recorded as the initial length, and the mark width on the sample in the width direction is recorded as the initial width. Subsequently, the sample is pulled at a pulling speed of 0.5 mm/min using a universal tensile testing apparatus of Instron type, and the dimensional variations of the mark length of the sample in the longitudinal direction and the mark width of the sample in the width direction are measured using an image sensor of KEYENCE CORPORATION. Thereafter, the Poisson's ratio ρ is determined by the following formula.

[Math. 4]

$$\rho = \frac{\left\{\frac{\text{(Dimensional variation of mark width [mm])}}{\text{(Initial width [mm])}}\right\}}{\left\{\frac{\text{(Dimensional variation of mark length [mm])}}{\text{(Initial length [mm])}}\right\}}$$

(Elastic limit value $\sigma_{MD}$ in the longitudinal direction) The elastic limit value $\sigma_{MD}$ [N] of the magnetic recording medium 10 in the longitudinal direction may be preferably 0.7 N≤$\sigma_{MD}$, more preferably 0.75 N≤$\sigma_{MD}$, and even more preferably 0.8 N≤$\sigma_{MD}$. If the elastic limit value $\sigma_{MD}$ is within the above-described range, width change of the magnetic recording medium 10 is further suppressed through adjustment of the tension of the magnetic recording medium 10 in the longitudinal direction with a recording and reproducing apparatus. Additionally, control of the drive side is facilitated. The upper limit of the elastic limit value $\sigma_{MD}$ of the magnetic recording medium 10 in the longitudinal direction is not particularly limited, and is, for example, $\sigma_{MD}$≤5.0 N. The elastic limit value $\sigma_{MD}$ preferably does not depend on the velocity V in the measurement of elastic limit. The reason for this is that independence of the elastic limit value $\sigma_{MD}$ from the velocity V allows effective suppression of width change of the magnetic recording medium 10 without being influenced by the traveling velocity of the magnetic recording medium 10 in a recording and reproducing apparatus, and the tension adjustment velocity and its responsiveness of the recording and reproducing apparatus. The elastic limit value $\sigma_{MD}$ is set at a desired value according to, for example, the selection of the curing conditions of the primary layer 12, the magnetic layer 13, and the back layer 14, and/or the selection of the material of the base layer 11. For example, with the increase of the curing time of the primary layer forming paint, the magnetic layer forming paint, and the back layer forming paint, or with the increase of the curing temperature, the reaction between the binder and the curing agent included in each paint is accelerated. This improves the elastic characteristic and the elastic limit value $\sigma_{MD}$. The elastic limit value $\sigma_{MD}$ can be determined as follows. Firstly, a magnetic recording medium 10 having a width of ½ inches is provided, cut into a piece having a length of 150 mm, thus making a sample. The both ends of the sample in the longitudinal direction are chucked with a universal tensile test apparatus in such a manner that the distance between the chucks $\lambda_0$ is $\lambda_0$=100 mm. Secondly, the sample is pulled at a pulling speed of 0.5 mm/min, and the load σ (N) to the distance between the chucks λ (mm) is continuously measured. Subsequently, using the data of λ (mm) and σ (N) thus obtained, the relationship between Δλ (%) and σ (N) are graphed. The Δλ(%) is obtained by the following formula.

$$\Delta\lambda(\%) = ((\lambda - \lambda_0)/\lambda_0) \times 100$$

Subsequently, in the region of σ≥0.2 N in the above graph, the region where the graph is a straight line is calculated, and the maximum load σ is recorded as the elastic limit value $\sigma_{MD}$ (N).

(Coefficient of Friction μ Between Magnetic Surface and Back Surface)

The coefficient of friction μ between the surface of the magnetic recording medium 10 on the magnetic layer side and the surface on the back layer side (hereinafter may be referred to as "coefficient of interlayer friction μ") is preferably 0.20≤μ≤0.83, and more preferably 0.20≤μ≤0.80. The coefficient of friction μ is within the above-described range improves handleability of the magnetic recording medium 10. For example, the coefficient of friction μ within the above-described range suppresses, for example, the occurrence of winding deviation during winding of the magnetic recording medium 10 on a reel (for example, the reel 10C in FIG. 5). More specifically, in a case where the coefficient of friction μ is too small (for example, in a case where μ<0.20), interlayer friction between the magnetic surface located on the outermost periphery of the magnetic recording medium 10 which has been already wound around the cartridge reel and the back surface of the magnetic recording medium 10 to be newly wound at its outside becomes extremely low, and the magnetic recording medium 10 to be newly wound can easily deviate from the magnetic surface located on the outermost periphery of the magnetic recording medium 10 which has been already wound. Accordingly, winding deviation of the magnetic recording medium 10 occurs. On the other hand, in a case where the coefficient of friction μ is too big (for example, in a case where 0.83<μ or 0.80<μ), interlayer friction between the back surface of the magnetic recording medium 10 to be just wound out from the outermost periphery of the reel on the drive side and the magnetic surface of the magnetic recording medium 10 which is located immediately below the former one and still wound around the drive reel becomes extremely high, and the back surface and the magnetic surface are adhered to each other. Accordingly, movement of the magnetic recording medium 10 toward the cartridge reel becomes unstable, this causes winding deviation of the magnetic recording medium 10.

The coefficient of friction μ is determined as follows. Firstly, the magnetic recording medium 10 having a width of ½ inches is wound around a cylindrical column having a 1 inch diameter with the back surface outward, thereby fixing the magnetic recording medium 10. Subsequently, with the cylindrical column, the magnetic recording medium 10 having a width of ½ inches is brought into contact at a holding angle θ (°)=180°+1° to 180°−10° in such a manner that the magnetic surface is in contact with the column, and one end of the magnetic recording medium 10 is connected with a movable strain gauge, and a tension $T_0$=0.6 (N) is applied to the other end. The movable strain gauge was shuttled to and fro eight times at 0.5 mm/s, and the readings $T_1$ (N) to $T_8$ (N) of the strain gauge at each outward path were measured, and the average of $T_4$ to $T_8$ is recorded as $T_{ave}$ (N). Thereafter, the coefficient of friction μ is determined by the following formula.

$$\mu = \frac{1}{(\theta[°]) \times (\pi/180)} \times \log_e\left(\frac{T_{ave} \ [N]}{T_0 \ [N]}\right) \quad [\text{Math. 5}]$$

(Surface Roughness $R_{ab}$ of Back Layer)

The surface roughness of the back layer 14 (more specifically, the surface roughness of the back surface) $R_{ab}$ [nm] is preferably 3.0 nm≤$R_{ab}$≤7.5 nm, and more preferably 3.0 nm≤$R_{ab}$≤7.3 nm. The surface roughness $R_{ab}$ of the back layer may be more preferably 7.2 nm or less, and even more preferably 7.0 nm or less, 6.5 nm or less, 6.3 nm or less, or 6.0 nm or less. Furthermore, the surface roughness $R_{ab}$ may be more preferably 3.2 nm or more, and even more preferably 3.4 nm or more. In a case where the surface roughness $R_{ab}$ of the back layer is within the above-described range, the magnetic recording medium 10 has improved handleability. Additionally, the influence on the surface of the magnetic layer is reduced during winding of the magnetic recording medium 10, and deleterious effect on the electromagnetic conversion characteristic is suppressed. The handleability and the electromagnetic conversion characteristic are contradictory characteristics, but the surface roughness $R_{ab}$ within the above-described value range makes them compatible.

The surface roughness of the back surface $R_{ab}$ is determined as follows. Firstly, a magnetic recording medium 10 having a width of ½ inches is provided, bonded to a slide glass with its back surface upward (more specifically, the magnetic surface is bonded to the slide glass), thus obtaining a sample piece.

Subsequently, surface roughness of the back surface of the sample piece is measured using the below-described noncontact roughness meter using light interference.
Apparatus: noncontact roughness meter using light interference
(noncontact surface-layer sectional shape measuring system, VertScan R5500GL-M100-AC, Ryoka Systems Inc.)
Objective lens: 20 times (field: about 237 μm×178 μm)
Resolution: 640 points×480 points
Measurement mode: phase
Wavelength filter: 520 nm
Surface correction: corrected by secondary multinomial approximation plane As described above, the surface roughness is measured at least five or more points in the longitudinal direction, and then the average of each arithmetic mean roughness Sa (nm), which is automatically calculated from the surface profile obtained at each point, is recorded as the surface roughness of the back surface $R_{ab}$ (nm).

(Surface Roughness $R_{abe}$ of Base Layer on Back Layer Side)

The surface roughness $R_{abe}$ of the base layer 11 on the back layer 14 side is 4.2 nm≤$R_{abe}$≤8.5 nm, more preferably 4.5 nm≤$R_{abe}$≤8.0 nm, and even more preferably 4.5 nm≤$R_{abe}$≤6.0 nm. The surface roughness $R_{abe}$ within the above-described range improves handleability of the magnetic recording medium 10.

Additionally, the surface roughness $R_{abe}$ within the above-described range reduces the influence on the surface of the magnetic layer during winding of the magnetic recording medium 10, and suppresses deleterious effect on the electromagnetic conversion characteristic.

It is particularly preferred that the surface roughness $R_{abe}$ be within the above-described value range, and the surface roughness $R_{ab}$ of the back layer be within the value range described in the above "(surface roughness $R_{ab}$ of the back layer)". For example, the surface roughness $R_{abe}$ of the base layer on the back layer side may be 4.2≤$R_{abe}$≤6.8, and the surface roughness $R_{ab}$ of the back layer may be 3.0≤$R_{ab}$≤6.5. The combination of these two surface roughnesses contributes to the improvement of handleability of the magnetic recording medium 10. Additionally, the combination of these two surface roughnesses reduces the influence exerted on the magnetic layer while improving the handleability.

The surface roughness $R_{abe}$ of the base layer on the back layer side is measured as follows. Firstly, the magnetic recording medium 10 having a length of about 10 cm in the longitudinal direction is provided. The layers laminated to the base layer 11 on the magnetic layer 13 side (for example, the magnetic layer 13 and the primary layer 12) are removed with methyl ethyl ketone (MEK). This removal exposes the surface of the base layer 11 on the magnetic layer 13 side. As a result of this, a laminate of the base layer 11 and the back layer 14 is obtained. The laminate is placed in 100 ml of MEK, and immersed for 24 hours. After the immersion, the laminate is treated in an ultrasonic cleaner at 60° C. for one hour. This treatment releases the back layer 14 from the base layer 11. After this treatment, if the back layer 14 remains on the base layer 11, the back layer 14 may be gently shaken off with a swab or the like without damaging the surface of the base layer 11. The above-described operation exposes the surface of the base layer 11 on the back layer side.

The base layer 11 is bonded to a slide glass with the surface on the back layer side upward (more specifically, the exposed surface of the base layer 11 on the magnetic layer 13 side is bonded to the slide glass), thus making a sample piece. Subsequently, the surface roughness of the surface of the base layer 11 on the back layer side of the test piece is measured by the apparatus and the method described in the above-described "(surface roughness $R_{ab}$ of the back layer)". Through the measurement, the surface roughness is measured at at least five or more points in the longitudinal direction, and then the average of each arithmetic mean roughness Sa (nm), which is automatically calculated from the surface profile obtained at each point, is recorded as the surface roughness $R_{abe}$ (nm) of the surface of the base layer 11 on the back layer side.

(Coercivity Hc)

The coercivity Hc of the magnetic recording medium 10 measured in the thickness direction (vertical direction) is preferably 220 kA/m or more and 310 kA/m or less, more preferably 230 kA/m or more and 300 kA/m or less, and even more preferably 240 kA/m or more and 290 kA/m or less. If the coercivity Hc is 220 kA/m or more, the coercivity Hc is sufficient and thus deterioration of a magnetization signal recorded on the adjacent tracks caused by a leaked magnetic field from the recording head is suppressed. Accordingly, better SNR is obtained. On the other hand, if the coercivity Hc is 310 kA/m or less, saturated recording with a recording head is facilitated, so that better SNR is obtained.

The coercivity Hc is determined as follows. Firstly, a measurement sample is cut out from the long magnetic recording medium 10, and the M-H loop of the entire measurement sample is measured using a vibrating sample magnetometer (VSM) in the thickness direction of the measurement sample (the thickness direction of the magnetic recording medium 10). Subsequently, the coating films (for example, the primary layer 12 and the magnetic layer 13) are removed using acetone or ethanol, the base layer 11 was left alone for background correction, and the M-H loop of the base layer 11 is measured in the thickness direction of the base layer 11 (the thickness direction of the magnetic recording medium 10) using VSM. Thereafter, the M-H loop of the base layer 11 is subtracted from the M-H loop of the entire measurement sample, and the M-H loop after background correction is obtained. The coercivity Hc is determined from the M-H loop thus obtained. Note that the measurements of the M-H loop are carried out at 25° C. In addition, the "diamagnetic field correction" in the measurement of the M-H loop in the vertical direction of the magnetic recording medium 10 is not carried out.

(Ratio R Between Coercivity Hc(50) and Coercivity Hc(25))

The ratio R between the coercivity Hc(50) of the magnetic recording medium 10 measured at 50° C. in the thickness direction (vertical direction) and the coercivity Hc(25) of the magnetic recording medium 10 measured at 25° C. in the thickness direction (=(Hc(50)/Hc(25))×100) is preferably 95% or more, more preferably 96% or more, even more preferably 97% or more, and particularly preferably 98% or more. If the proportion R is 95% or more, temperature dependency of the coercivity Hc decreases, and deterioration of SNR in high temperature environments is suppressed.

The coercivity Hc(25) is determined in a manner similar to the method for measuring the coercivity Hc. In addition, the coercivity Hc(50) is determined in a manner similar to the method for measuring the coercivity Hc, except that the M-H loops of the measurement sample and the base layer 11 are measured at 50° C.

(Squareness Ratio S1 Measured in the Longitudinal Direction)

The squareness ratio S1 of the magnetic recording medium 10 measured in the longitudinal direction (traveling direction) is preferably 35% or less, more preferably 27% or less, and even more preferably 20% or less. If the squareness ratio S1 is 35% or less, the magnetic powder has sufficiently high vertical orientation, so that better SNR is obtained. Accordingly, better electromagnetic conversion characteristic is obtained. Additionally, the shape of a servo signal is improved, and control on the drive side is more facilitated.

In the present description, vertical orientation of the magnetic recording medium can mean that the squareness ratio S1 of the magnetic recording medium is within the above-described value range (for example, 35% or less). The magnetic recording medium according to the present technology is preferably vertically oriented.

The squareness ratio S1 is determined as follows. Firstly, a measurement sample is cut out from the long magnetic recording medium 10, and the M-H loop of the entire measurement sample corresponding to the longitudinal direction (traveling direction) of the magnetic recording medium 10 is measured using VSM. Subsequently, the coating films (for example, the primary layer 12 and the magnetic layer 13) are removed using, for example, acetone or ethanol, the base layer 11 is left alone for background correction, and the M-H loop of the base layer 11 corresponding to the longitudinal direction of the base layer 11 (traveling direction of the magnetic recording medium 10) is measured using VSM. Thereafter, the M-H loop of the base layer 11 is subtracted from the M-H loop of the entire measurement sample, thus obtaining the M-H loop after background correction. The magnetization saturation Ms (emu) of the M-H loop thus obtained and the residual magnetization Mr (emu) are substituted into the following formula, thereby calculating the squareness ratio S1 (%). Note that the measurement of the M-H loop is carried out at 25° C.

$$\text{Squareness ratio } S1(\%) = (Mr/Ms) \times 100$$

(Squareness Ratio S2 Measured in the Vertical Direction)

The squareness ratio S2 of the magnetic recording medium 10 measured in the vertical direction (thickness direction) is preferably 65% or more, more preferably 73% or more, and even more preferably 80% or more. If the squareness ratio S2 is 65% or more, the magnetic powder has sufficiently high vertical orientation, so that better SNR is obtained. Accordingly, better electromagnetic conversion characteristic is obtained. Additionally, the servo signal shape is improved, control on the drive side is facilitated.

In the present description, vertical orientation of the magnetic recording medium may mean that the squareness ratio S2 of the magnetic recording medium is within the above-described value range (for example, 65% or more). The squareness ratio S2 is determined in a manner similar to the determination of the squareness ratio S1, except that the M-H loop is measured in the vertical direction (thickness direction) of the magnetic recording medium 10 and the base layer 11. Note that, in the measurement of the squareness ratio S2, "diamagnetic field correction" in the measurement of the M-H loop in the vertical direction of the magnetic recording medium 10 is not carried out.

The squareness ratios S1 and S2 are set at desired values by adjusting, for example, the intensity of a magnetic field applied to the magnetic layer forming paint, the time for application of a magnetic field to the magnetic layer forming paint, the dispersion condition of a magnetic powder in the magnetic layer forming paint, or the concentration of the solid component in the magnetic layer forming paint. Specifically, for example, with the increase of the intensity of a magnetic field, the squareness ratio S1 decreases, while the squareness ratio S2 increases. Additionally, with the increase of the time for application of a magnetic field, the squareness ratio S1 decreases, while the squareness ratio S2 increases. Additionally, with the improvement of the dispersion condition of a magnetic powder, the squareness ratio S1 decreases, while the squareness ratio S2 increases. Additionally, with the decrease of the concentration of the solid component, the squareness ratio S1 decreases, while the squareness ratio S2 increases. Note that the adjustment method may be used alone, or in combination of two or more of them.

(SFD)

Figure 4:
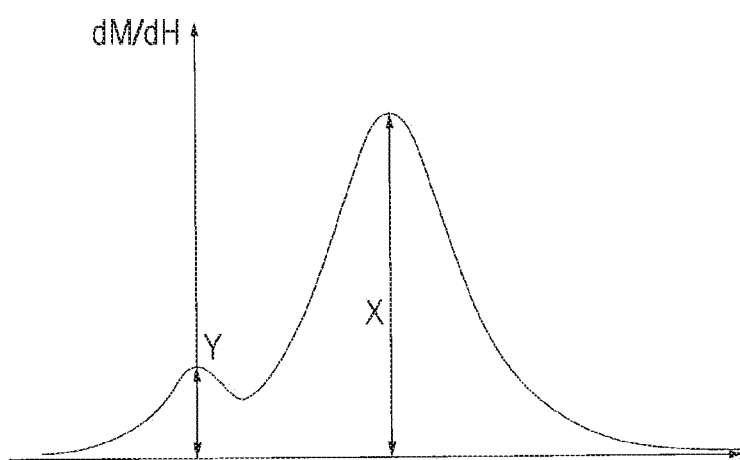
FIG. 4 is a graph depicting an example of an SFD curve.

In the switching field distribution (SFD) curve of the magnetic recording medium 10, the peak ratio X/Y of the height X of the main peak and the height Y of the sub peak in the vicinity of the zero magnetic field is preferably 3.0 or more, more preferably 5.0 or more, even more preferably 7.0 or more, particularly preferably 10.0 or more, and most preferably 20.0 or more (see FIG. 4).

If the peak ratio X/Y is 3.0 or more, inclusion of large amounts of low coercivity components (for example, soft magnetic particles and super paramagnetic particles) characteristic to ε-iron oxide in the magnetic powder besides the ε-iron oxide particles contributing to actual recording is suppressed. Accordingly, this suppresses deterioration of a magnetizing signal recorded on the adjacent track by a magnetic field leaked from a recording head, whereby better SNR is obtained. The upper limit of the peak ratio X/Y is not particularly limited, and, for example, 100 or less.

The peak ratio X/Y is determined as follows. Firstly, in a manner similar to the measurement of the coercivity Hc, the M-H loop after background correction is obtained.

Subsequently, a SFD curve is obtained from the M-H loop thus obtained. Calculation of the SFD curve may use a program attached to the measuring instrument, or other program. The absolute value of the point where the calculated SFD curve traverses the Y axis (dM/dH) is defined as "Y", and the height of the main peak observed near the coercivity Hc in the M-H loop is defined as "X", and the peak ratio X/Y is calculated. Note that measurement of the M-H loop is carried out at 25° C. in a manner similar to the method for measuring the coercivity Hc. Additionally, the "diamagnetic field correction" in the measurement of the M-H loop in the thickness direction (vertical direction) of the magnetic recording medium 10 is not carried out.

(Activated Volume $V_{act}$)

The activated volume $V_{act}$ is preferably 8000 nm$^3$ or less, more preferably 6000 nm$^3$ or less, even more preferably 5000 nm$^3$ or less, particularly preferably 4000 nm$^3$ or less, and most preferably 3000 nm$^3$ or less. If the activated volume $V_{act}$ is 8000 nm$^3$ or less, dispersion condition of the magnetic powder is good, so that the bit inversion region can be steepened, and this suppresses deterioration of a magnetization signal recorded on the adjacent tracks caused by leakage of a magnetic field from the recording head. Accordingly, better SNR may be obtained.

The activated volume $V_{act}$ is determined by the following formula derived by Street & Woolley.

$$V_{act} (\text{nm}^3) = k_B \times T \times X_{irr} / (\mu_0 \times Ms \times S)$$

(Note that $k_B$: Boltzmann constant (1.38×10$^{-23}$ J/K), T: temperature (K), $X_{irr}$: nonreversible magnetic susceptibility, $\mu_0$: vacuum magnetic permeability, S: coefficient of magnetic viscosity, Ms: magnetization saturation (emu/cm$^3$))

The nonreversible magnetic susceptibility $X_{irr}$, the magnetization saturation Ms, and the coefficient of magnetic viscosity S substituted into the above formula are determined as follows using VSM. Note that the measurement direction by VSM is the thickness direction (vertical direction) of the magnetic recording medium 10. Additionally the measurement by VSM is carried out at 25° C. on a measurement sample cut out from the long magnetic recording medium 10. Additionally, the "diamagnetic field correction" in the measurement of the M-H loop in the thickness direction (vertical direction) of the magnetic recording medium 10 is not carried out.

(Nonreversible Magnetic Susceptibility $X_{irr}$)

The nonreversible magnetic susceptibility $X_{irr}$ is defined as the decline near the residual coercivity Hr in the decline of the residual magnetization curve (DCD curve). Firstly, a magnetic field of −1193 kA/m (15 kOe) is applied to the whole of the magnetic recording medium 10, and the magnetic field is returned to zero thereby making a residual magnetization state. Thereafter, a magnetic field of about 15.9 kA/m (200 Oe) is applied in the opposite direction and the magnetic field is returned to zero again, and the residual magnetization amount is measured. Thereafter, in a similar way, a magnetic field which is 15.9 kA/m larger than the previously applied magnetic field is applied and the magnetic field is returned to zero, this measurement is repeatedly carried out, and the residual magnetization amount is plotted with reference to the applied magnetic field, thereby measuring the DCD curve. From the DCD curve thus obtained, the point having a zero magnetization amount is set as the residual coercivity Hr, additionally the DCD curve is differentiated, and the decline of the DCD curve in each magnetic field is determined. In the decline of the DCD curve, the decline near the residual coercivity Hr is set at $X_{irr}$.

(Magnetization Saturation Ms)

Firstly, the M-H loop of the entire magnetic recording medium 10 (measurement sample) is measured in the thickness direction of the magnetic recording medium 10. Subsequently, the coating films (for example, the primary layer 12 and the magnetic layer 13) are removed using, for example, acetone and ethanol, and the base layer 11 is left alone for background correction, and the M-H loop of the base layer 11 is measured in the thickness direction in a similar manner. Thereafter, the M-H loop of the base layer 11 is subtracted from the M-H loop of the entire magnetic recording medium 10, thereby obtaining the M-H loop after background correction. From the value of the magnetization saturation Ms (emu) of the M-H loop thus obtained and the volume (cm$^3$) of the magnetic layer 13 in the measurement sample, Ms (emu/cm$^3$) is calculated. Note that the volume of the magnetic layer 13 can be determined by multiplying the area of the measurement sample with the average thickness of the magnetic layer 13. The method for calculating the average thickness of the magnetic layer 13 necessary for calculating the volume of the magnetic layer 13 is described below.

(Coefficient of Magnetic Viscosity S)

Firstly, a magnetic field of −1193 kA/m (15 kOe) is applied to the entire magnetic recording medium 10 (measurement sample), the magnetic field is returned to zero, and the sample is brought into a residual magnetization state. Thereafter, in the opposite direction, a magnetic field equivalent to the value of the residual coercivity Hr obtained by the DCD curve is applied. With the magnetic field applied, the magnetization amount is continuously measured at regular time intervals for 1000 seconds. The relationship between the time t and the magnetization amount M(t) thus obtained is referred to the following formula, and the coefficient of magnetic viscosity S is calculated.

$$M(t)=M0+S\times\ln(t)$$

(Noted that M(t): magnetization amount at time t, M0: initial magnetization amount, S: coefficient of magnetic viscosity, ln(t): natural logarithm of time)

(Arithmetic Average Roughness Ra)

The arithmetic average roughness Ra of the magnetic surface is preferably 2.5 nm or less, and more preferably 2.0 nm or less. If the Ra is 2.5 nm or less, better SNR is obtained.

The arithmetic average roughness Ra is determined as follows. Firstly, using an atomic force microscope (AFM) (Dimension Icon, Bruker Corporation), the surface on the side having the magnetic layer 13 is observed, and a cross section profile is obtained. Subsequently, from the cross section profile thus obtained, the arithmetic average roughness Ra is obtained in accordance with JIS B0601:2001.

(4) Method for Producing Magnetic Recording Medium

Subsequently, the method for producing the magnetic recording medium 10 composing the above-described configuration is described. Firstly, a non-magnetic powder, a binder, and others are kneaded with and/or dispersed in a solvent, thereby preparing a primary layer forming paint. Subsequently, a magnetic powder, a binder, and others are kneaded with and/or dispersed in a solvent, thereby preparing a magnetic layer forming paint. Preparation of the magnetic layer forming paint and the primary layer forming paint may use for example, any of the following solvents, dispersers, and kneaders. Examples of the solvent used for preparation of the paints include ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethyleneglycol dimethyl ether, 2-ethoxyethanol, tetrahydrofuran, and dioxane; aromatic hydrocarbon solvents such as benzene, toluene, and xylene; and hydrocarbon halide solvents such as methylene chloride, ethylene chloride, carbon tetrachloride, chloroform, and chlorobenzene. These solvents may be used alone, or in combination of two or more of them.

Examples of the kneader used for the preparation of the paints include, but not particularly limited to, kneaders such as a continuous biaxial kneading machine, a continuous biaxial kneading machine allowing multistage dilution, a kneader, a pressurizing kneader, and a roll kneader. Additionally, examples of the disperser used for the preparation of the paints include, but not particularly limited to, disperses such as a roll mill, a ball mill, a horizontal sand mill, a vertical sand mill, a spike mill, a pin mill, a tower mill, a pearl mill (for example, "DCP mill", Einrich Draiswerkes), a homogenizer, and an ultrasonic disperser.

Subsequently, the primary layer forming paint is applied to one of the main surfaces of the base layer 11 and dried, thereby forming the primary layer 12.

Subsequently, the magnetic layer forming paint is applied to the primary layer 12 and dried, thereby forming the magnetic layer 13 on the primary layer 12. Note that, in the drying process, a magnetic powder is subjected to magnetic field orientation in the thickness direction of the base layer 11 using, for example, a solenoid coil.

Alternatively, in the drying process, a magnetic powder is subjected to magnetic field orientation in the longitudinal direction (traveling direction) of the base layer 11 using, for example, a solenoid coil, and then subjected to magnetic field orientation in the thickness direction of the base layer 11. After formation of the magnetic layer 13, the back layer 14 is formed on the other main surface of the base layer 11. As a result of this, the magnetic recording medium 10 is obtained.

Thereafter, the magnetic recording medium 10 thus obtained is wound again around a large diameter core, and subjected to curing treatment. Finally, the magnetic recording medium 10 is calendared, and cut to a predetermined width (for example, a width of ½ inches). In this manner, the desired slim and long magnetic recording medium 10 is obtained.

(5) Recording and Reproducing Apparatus

[Configuration of Recording and Reproducing Apparatus]

Figure 5:
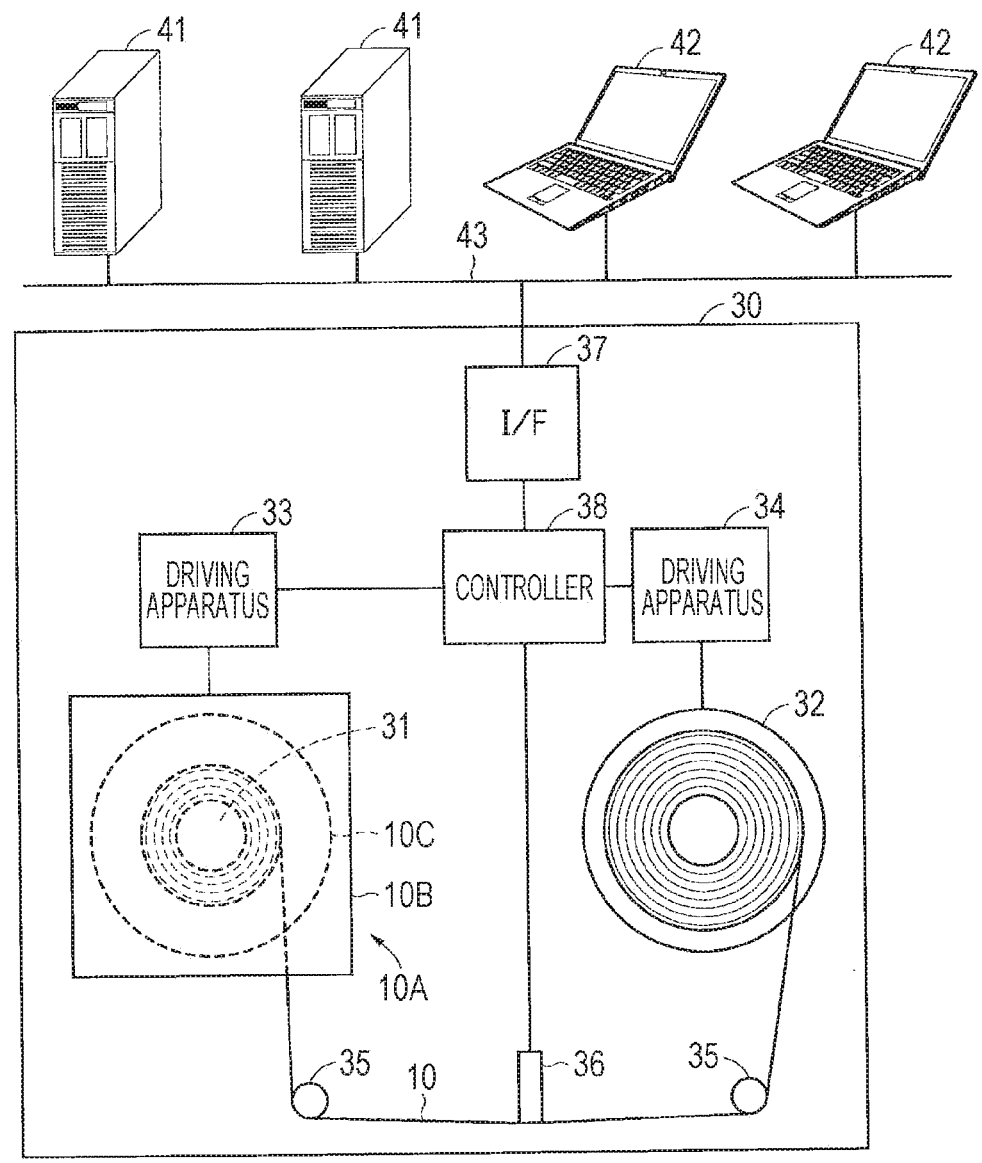
FIG. 5 is a schematic diagram depicting a configuration of a recording and reproducing apparatus.

Subsequently, an example of the configuration of a recording and reproducing apparatus 30 for recording and reproducing the magnetic recording medium 10 having the above-described configuration is described with reference to FIG. 5.

The recording and reproducing apparatus 30 has a configuration allowing adjustment of the tension applied to the magnetic recording medium 10 in the longitudinal direction. Additionally, the recording and reproducing apparatus 30 has a configuration allowing loading of a magnetic recording medium cartridge 10A. For easy understanding, the recording and reproducing apparatus 30 referred to herein has a configuration which can load one magnetic recording medium cartridge 10A, but the recording and reproducing apparatus 30 may have a configuration which can load a plurality of magnetic recording medium cartridges 10A.

The recording and reproducing apparatus 30 is connected to information processors such as a server 41 and a personal computer (hereinafter referred to as "PC") 42 through a network 43, and is configured to allow recording of the data supplied from these information processors on the magnetic recording medium cartridge 10A. The shortest recording wavelength of the recording and reproducing apparatus 30 is preferably 100 nm or less, more preferably 75 nm or less, even more preferably 60 nm or less, and particularly preferably 50 nm or less. The recording and reproducing apparatus includes, as depicted in FIG. 5, a spindle 31, a reel 32 on the recording and reproducing apparatus side, a spindle driving apparatus 33, a reel driving apparatus 34, a plurality of guide rollers 35, a head unit 36, a communication interface (hereinafter referred to as I/F) 37, and a controller 38.

The spindle 31 is configured to allow loading of the magnetic recording medium cartridge 10A. The magnetic recording medium cartridge 10A is in conformity with Linear Tape Open (LTO) specification, and is contained in the cartridge case 10B so as to allow rotation of a single reel 100 wound with the magnetic recording medium 10. On the magnetic recording medium 10, a servo pattern in an inverted V shape as a servo signal has been recorded. The reel 32 is configured so as to allow fixation of the tip of the magnetic recording medium 10 drawn from the magnetic recording medium cartridge 10A. The present technology also provides a magnetic recording cartridge including a magnetic recording medium according to the present technology. In the magnetic recording cartridge, the magnetic recording medium may be, for example, wound around a reel.

The spindle driving apparatus 33 is an apparatus for rotating and driving the spindle 31. The reel driving apparatus 34 is an apparatus for rotating and driving the reel 32. In a case where data is recorded or reproduced on the magnetic recording medium 10, the spindle driving apparatus 33 and the reel driving apparatus 34 rotate and drive the spindle 31 and the reel 32 to travel the magnetic recording medium 10. The guide roller 35 is a roller for guiding the traveling of the magnetic recording medium 10.

The head unit 36 includes a plurality of recording heads for recording a data signal on the magnetic recording medium 10, a plurality of reproducing heads for reproducing the data signal recorded on the magnetic recording medium 10, and a plurality of servo heads for reproducing the servo signal recorded on the magnetic recording medium 10. The recording head may be, for example, a ring-shaped head, but the type of the recording head is not limited to this.

The communication I/F 37 communicates with the information processors such as the server 41 and the PC 42, and is connected to the network 43.

The controller 38 controls the entire recording and reproducing apparatus 30. For example, according to requests of the information processors such as the server 41 and the PC 42, the controller 38 records the data signal supplied from the information processors on the magnetic recording medium 10 by the head unit 36. Additionally, according to requests of the information processors such as the server 41 and the PC 42, the controller 38 reproduces the data signal recorded on the magnetic recording medium 10 by the head unit 36, and supplies the data signal to the information processors. Additionally, on the basis of the servo signal suppled from the head unit 36, the controller 38 detects width change of the magnetic recording medium 10.

Specifically, as the servo signal, a plurality of servo patterns in an inverted V shape is recorded on the magnetic recording medium 10, the head unit 36 reproduces different two servo patterns simultaneously with the two servo heads on the head unit 36, thus obtaining each servo signal. Using the relative positional information of the servo patterns and the head unit obtained from the servo signal, the position of the head unit 36 is controlled so as to follow the servo pattern. At the same time, information regarding the distance between the servo patterns is also obtained by comparing the two servo signal waveforms. Changes in the distance between the servo patterns in these measurements can be obtained by comparing the information regarding the distance between the servo patterns obtained in these measurements. The width change of the magnetic recording medium 10 can be also calculated by adding the information regarding the distance between the servo patterns in servo pattern recording to the changes in the distance between the servo patterns. On the basis of the change in the distance between the servo patterns obtained as described above, or the change of the calculated width of the magnetic recording medium 10, the controller 38 controls rotation and driving of the spindle driving apparatus 33 and the reel driving apparatus 34, and adjusts the tension of the magnetic recording medium 10 in the longitudinal direction so as to make the width of the magnetic recording medium 10 the predetermined width or almost the predetermined width.

As a result of this, width change of the magnetic recording medium 10 is suppressed.

[Operation of Recording and Reproducing Apparatus]

Subsequently, operation of the recording and reproducing apparatus 30 having the above-described configuration is described.

Firstly, the magnetic recording medium cartridge 10A is mounted on the recording and reproducing apparatus 30, the leading end of the magnetic recording medium 10 is pulled out, and transferred to the reel 32 through a plurality of the guide rollers 35 and the head units 36, and the leading edge of the magnetic recording medium 10 is attached to the reel 32.

Subsequently, by operating an operating unit (not depicted), the spindle driving apparatus 33 and the reel driving apparatus 34 are driven by control of the controller 38, and the spindle 31 and the reel 32 are rotated in the same direction so as to travel the magnetic recording medium 10 from the reel 10C toward the reel 32. As a result of this, while the magnetic recording medium 10 is wound around the reel 32, the head unit 36 records information on the magnetic recording medium 10 or reproduces information recorded on the magnetic recording medium 10.

Additionally, in a case where the magnetic recording medium 10 rewound around the reel 100, the spindle 31 and the reel 32 are rotatably driven in a direction opposite to the above-described direction, whereby the magnetic recording medium 10 is traveled from the reel 32 to the reel 100. Also in this rewinding, recording of information on the magnetic recording medium 10 or reproduction of information recorded on the magnetic recording medium 10 is carried out by the head unit 36.

(6) Effect

In the magnetic recording medium 10 according to the first embodiment, the average thickness $t_T$ of the magnetic recording medium 10 is $t_T \leq 5.5$ μm, the dimensional variation $\Delta w$ of the magnetic recording medium 10 in the width direction to tension change of the magnetic recording medium 10 in the longitudinal direction is 660 ppm/N≤Δw, and the surface roughness $R_{abe}$ of the base layer on the back layer side is 4.2 nm $R_{abe} \leq 8.5$ nm. As a result of this, width change of the magnetic recording medium 10 can be suppressed through adjustment of the tension of the magnetic recording medium 10 in the longitudinal direction with a recording and reproducing apparatus. For example, even if temperature and humidity change, which can cause width change of the magnetic recording medium 10, occurs, the width of the magnetic recording medium 10 is kept constant or generally constant. Furthermore, the magnetic recording medium 10 is as thin as $t_T \leq 5.5$ μm, but has marked handleability.

(7) Modification

[Modification 1]

Figure 7:
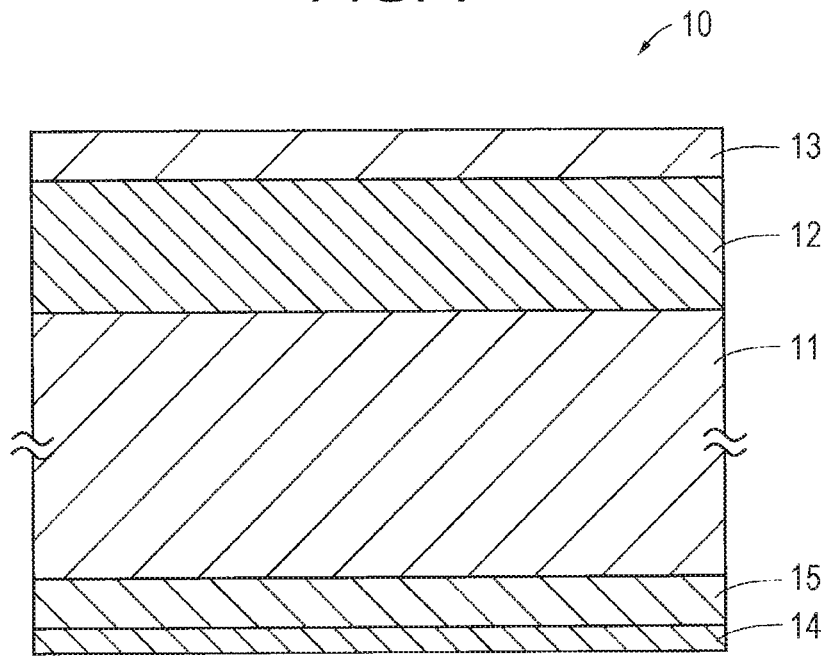
FIG. 7 is a cross sectional view depicting a configuration of a magnetic recording medium according to a modification.

As depicted in FIG. 7, the magnetic recording medium 10 may further include a barrier layer 15 provided on at least one surface of the base layer 11. The barrier layer 15 is a layer for suppressing dimensional change of the base layer 11 according to environment. For example, an example of the factor causing the dimensional change is hygroscopicity of the base layer 11, and the barrier layer 15 reduces the rate of invasion of moisture into the base layer 11. The barrier layer 15 includes a metal or a metal oxide. The metal may be, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta. The metal oxide may be, for example, at least one of $Al_2O_3$, CuO, CoO, $SiO_2$, $Cr_2O_3$, $TiO_2$, $Ta_2O_5$, or $ZrO_2$, or any of the oxide of the metal listed above. Alternatively, diamond-like carbon (DLC) or diamond may be used. The average thickness of the barrier layer 15 is preferably 20 nm or more and 1000 nm or less, and more preferably 50 nm or more and 1000 nm or less. The average thickness of the barrier layer 15 is determined in a manner similar to the average thickness $t_m$ of the magnetic layer 13. However, the magnification of the TEM image is adjusted as appropriate according to the thickness of the barrier layer 15.

[Modification 2]

The magnetic recording medium 10 may be incorporated into a library apparatus. More specifically, the present technology also provides a library apparatus including at least one magnetic recording medium 10. The library apparatus has a configuration which can adjust the tension applied to the magnetic recording medium 10 in the longitudinal direction, and may include a plurality of the recording and reproducing apparatuses 30.

[Modification 3]

The magnetic recording medium 10 may be subjected to servo signal write-in processing by a servo writer. By adjustment of the tension of the magnetic recording medium 10 in the longitudinal direction by the servo writer during, for example, recording of a servo signal, the width of the magnetic recording medium 10 can be kept constant or generally constant. In this case, the servo writer may include a detection apparatus for detecting the width of the magnetic recording medium 10. The servo writer can adjust the tension of the magnetic recording medium 10 in the longitudinal direction on the basis of the detection result of the detection apparatus.

3. Second Embodiment (Example of Magnetic Recording Medium of Vacuum Thin Film Type)

(1) Configuration of Magnetic Recording Medium

Figure 8:
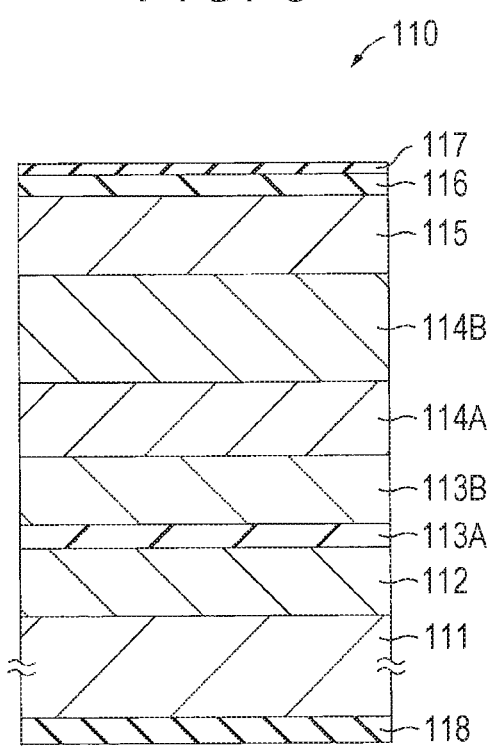
FIG. 8 is a cross sectional view depicting a configuration of a magnetic recording medium according to a second embodiment.

The magnetic recording medium 110 according to the second embodiment is a long vertical magnetic recording medium, and includes, as depicted in FIG. 8, a filmy base layer 111, a soft magnetic underlayer (hereinafter referred to as "SUL") 112, a first seed layer 113A, a second seed layer 113B, a first primary layer 114A, a second primary layer 114B, and a magnetic layer 115. The SUL 112, the first and second seed layers 113A and 113B, the first and second primary layers 114A and 114B, and the magnetic layer 115 may be, for example, vacuum thin films such as a layer formed by sputtering (hereinafter may be referred to as "sputtering layer").

The SUL 112, the first and second seed layers 113A and 113B, and the first and second primary layers 114A and 114B are provided between one main surface of the base layer 111 (hereinafter referred to as "surface") and the magnetic layer 115, and the SUL 112, the first seed layer 113A, the second seed layer 113B, the first primary layer 114A, and the second primary layer 114B are laminated in this order from the base layer 111 toward the magnetic layer 115.

The magnetic recording medium 110 may include, as necessary, a protective layer 116 provided on the magnetic layer 115 and a lubricating layer 117 provided on the protective layer 116. Additionally, the magnetic recording medium 110 may further include, as necessary, a back layer 118 provided on the other main surface of the base layer 111 (hereinafter referred to as "back surface").

Hereinafter the longitudinal direction of the magnetic recording medium 110 (the longitudinal direction of the base layer 111) is referred to as machine direction (MD).

Here, the machine direction is the moving direction of the recording and reproducing head relative to the magnetic recording medium 110, more specifically the traveling direction of the magnetic recording medium 110 during recording and reproducing.

The magnetic recording medium 110 according to the second embodiment is suitable as a storage media for data archive, the demand for which is expected to further grow in future. The magnetic recording medium 110 can achieve, for example, ten times or more the surface recording density of the current storage magnetic recording medium of coating type, or 50 Gb/in$^2$ or more of the surface recording density. In a case where a data cartridge of common linear recording system is composed using the magnetic recording medium 110 having such surface recording density, high-capacity recording of 100 TB or more per one data cartridge will be achieved.

The magnetic recording medium 110 according to the second embodiment is suitable for the use in a recording and reproducing apparatus (recording and reproducing apparatus for recording and reproducing data) having a ring-shaped recording head and a reproducing head of giant magnetoresistive (GMR) type or tunneling magnetoresistive (TMR) type. Additionally, for the magnetic recording medium 110 according to the second embodiment, the use of a ring-shaped recording head as a servo signal writing head is preferred. On the magnetic layer 115, for example, a data signal is vertically recorded with a ring-shaped recording head.

Additionally, on the magnetic layer 115, for example, a servo signal is vertically recorded with a ring-shaped recording head.

(2) Details of Each Layer (Base Layer)

For the base layer 111, the description about the base layer 11 in the first embodiment holds true, so that description about the base layer 111 is omitted.

(SUL)

The SUL 112 includes an amorphous soft magnetic material. The soft magnetic material includes, for example, at least one of Co materials or Fe materials. Examples of the Co material include CoZrNb, CoZrTa, or CoZrTaNb. Examples of the Fe material include FeCoB, FeCoZr, or FeCoTa.

The SUL 112 is a single layer SUL, and is directly provided on the base layer 111. The average thickness of the SUL 112 is preferably 10 nm or more and 50 nm or less, and more preferably 20 nm or more and 30 nm or less.

The average thickness of the SUL 112 is determined by the same method as that for measuring the average thickness of the magnetic layer 13 in the first embodiment. Note that the average thickness of the below-described layers other than the SUL 112 (more specifically, the average thicknesses of the first and second seed layers 113A and 113B, the first and second primary layers 114A and 114B, and the magnetic layer 115) can be determined by the same method as the method for measuring the average thickness of the magnetic layer 13 in the first embodiment.

However, the magnification of the TEM image is adjusted as appropriate according to the thickness of each layer.

(First and Second Seed Layers)

The first seed layer 113A includes an alloy including Ti and Cr, and has an amorphous state. In addition, the alloy may further include O (oxygen). The oxygen may be impurity oxygen included in a trace amount in the first seed layer 113A during formation of the first seed layer 113A by a deposition method such as a sputtering method. The term "alloy" means at least one of, for example, a solid solution, an eutectic body, or an intermetallic compound containing Ti and Cr. The term "amorphous state" means that halo is observed by, for example, X-ray diffraction or electron diffraction, and no crystal structure can be specified.

The atomic ratio of Ti to the total amount of Ti and Cr included in the first seed layer 113A is preferably 30 atom % or more and less than 100 atom %, and more preferably 50 atom % or more and less than 100 atom %. If the atomic ratio of Ti is less than 30%, the (100) face of the body-centered cubic lattice (bcc) structure of Cr is oriented, whereby orientation of the first and second primary layers 114A and 114B formed on the first seed layer 113A may decrease.

The atomic ratio of Ti is determined as follows. While subjecting the magnetic recording medium 110 to ion milling from the side of the magnetic layer 115, depth profile analysis of the first seed layer 113A is carried out by Auger electron spectroscopy (hereinafter referred to as "AES"). Subsequently, the average compositions (average atomic ratios) of Ti and Cr in the film thickness direction are determined from the depth profile thus obtained. Subsequently, using the determined average compositions of Ti and Cr, the atomic ratio of Ti is determined.

In a case where the first seed layer 113A includes Ti, Cr, and O, the atomic ratio of O to the total amount of Ti, Cr, and O included in the first seed layer 113A is preferably 15 atom % or less, and more preferably 10 atom % or less. If the atomic ratio of O is more than 15 atom %, $TiO_2$ crystal is generated to influence the nucleation of the first and second primary layers 114A and 114B formed on the first seed layer 113A, and orientation of the first and second primary layers 114A and 114B may decrease. The atomic ratio of the O is determined using an analysis method similar to that for the atomic ratio of the Ti.

The alloy included in the first seed layer 113A may further include other additional element besides Ti and Cr. Examples of the additional element include at least one element selected from the group including Nb, Ni, Mo, Al, and W.

The average thickness of the first seed layer 113A is preferably 2 nm or more and 15 nm or less, and more preferably 3 nm or more and 10 nm or less.

The second seed layer 113B includes, for example, NiW or Ta, and has a crystalline state. The average thickness of the second seed layer 113B is preferably 3 nm or more and 20 nm or less, and more preferably 5 nm or more and 15 nm or less.

The first and second seed layers 113A and 113B have a crystal structure similar to that of the first and second primary layers 114A and 114B, and are not seed layers provided for the purpose of crystal growth, but are seed layers improving vertical orientation of the first and second primary layers 114A and 114B by the amorphous state of the first and second seed layers 113A and 113B.

(First and Second Primary Layers)

The first and second primary layers 114A and 114B preferably have a crystal structure similar to that of the magnetic layer 115. In a case where the magnetic layer 115 includes a Co alloy, the first and second primary layers 114A and 114B preferably include a material having a hexagonal close-packed (hcp) structure similar to that of a Co alloy, and the c axis of the structure is preferably oriented in a vertical direction (more specifically in a film thickness direction) to the film surface. This improves orientation of the magnetic layer 115, and achieves relatively good matching of the lattice constants of the second primary layer 114B and the magnetic layer 115. The material having a hexagonal close-packed (hcp) structure is preferably a material including Ru, and specifically preferably simple Ru or a Ru alloy. Examples of the Ru alloy include Ru alloy oxides such as Ru—$SiO_2$, Ru—$TiO_2$, and Ru—$ZrO_2$, and the Ru alloy may be one of them.

As described above, a similar material may be used as the materials of the first and second primary layers 114A and 114B. However, the intended effect of the first and second primary layers 114A and 114B are different.

Specifically, the second primary layer 114B has a layer structure which promotes the granular structure of the magnetic layer 115 as the upper layer, and the first primary layer 114A has a layer structure having high crystal orientation. In order to obtain these layer structures, deposition conditions such as sputtering conditions for the first and second primary layers 114A and 114B are preferably different.

The average thickness of the first primary layer 114A is preferably 3 nm or more and 15 nm or less, and more preferably 5 nm or more and 10 nm or less. The average thickness of the second primary layer 114B is preferably 7 nm or more and 40 nm or less, and more preferably 10 nm or more and 25 nm or less.

(Magnetic Layer)

The magnetic layer (may be referred to as recording layer) 115 may be a vertical magnetic recording layer including a vertically oriented magnetic material. The magnetic layer 115 is preferably a granular magnetic layer including a Co alloy, from the viewpoint of improving its recording density. The granular magnetic layer includes ferromagnetic crystal particles including a Co alloy, and non-magnetic grain boundaries (non-magnetic substance) surrounding the ferromagnetic crystal particles. More specifically, the granular magnetic layer includes columns (columnar crystals) including a Co alloy and non-magnetic grain boundaries (for example, oxide such as $SiO_2$) surrounding the columns and magnetically separate these columns. This structure composes the magnetic layer 115 having a structure including magnetically separated columns.

The Co alloy has a hexagonal close-packed (hcp) structure, and its c axis is oriented in a vertical direction (film thickness direction) relative to the film surface. As the Co alloy, it is preferred that a CoCrPt alloy including at least Co, Cr, and Pt be used. The CoCrPt alloy may further include an additional element. Examples of the additional element include at least one element selected from the group including Ni, Ta, and the like.

The non-magnetic grain boundaries surrounding the ferromagnetic crystal particles include a non-magnetic metal material. The metal includes semimetals. As the non-magnetic metal material, for example, at least one of metal oxide or metal nitride may be used, and the use of metal oxide is preferred, from the viewpoint of stably keeping a granular structure. Examples of the metal oxide include metal oxides containing at least one element selected from the group including Si, Cr, Co, Al, Ti, Ta, Zr, Ce, Y, Hf, and the like, and metal oxides including at least Si oxide (more specifically, $SiO_2$) is preferred. Specific examples of the metal oxide include $SiO_2$, $Cr_2O_3$, CoO, $Al_2O_3$, $TiO_2$, $Ta_2O_5$, $ZrO_2$, and $HfO_2$.

Examples of the metal nitride include metal nitrides containing at least one element selected from the group including Si, Cr, Co, Al, Ti, Ta, Zr, Ce, Y, Hf, and the like. Specific examples of the metal nitride include SiN, TiN, and AlN.

The CoCrPt alloy included in the ferromagnetic crystal particles and the Si oxide included in the non-magnetic grain boundaries preferably have the average composition represented by the following formula (1). The reason for this is that a magnetization saturation Ms which suppresses the influence of a demagnetizing field and ensures sufficient reproduction output is achieved, whereby further improvement of recording and reproducing characteristic is achieved.

$$(Co_xPt_yCr_{100-x-y})_{100-z}\text{—}(SiO_2)_z \quad (1)$$

(Note that in the formula (1), x, y, and z are the values within the ranges of $69 \leq x \leq 75$, $10 \leq y \leq 16$, and $9 \leq z \leq 12$, respectively.)

Note that the above composition can be determined as follows. While subjecting the magnetic recording medium 110 to ion milling from the side of the magnetic layer 115, depth profile analysis of the magnetic layer 115 is carried out by AES, and the average compositions (average atomic ratios) of Co, Pt, Cr, Si, and O in the film thickness direction are obtained.

The average thickness $t_m$ [nm] of the magnetic layer 115 is preferably 9 nm$\leq t_m \leq$90 nm, more preferably 9 nm $t_m \leq$20 nm, and even more preferably 9 nm$\leq t_m \leq$15 nm. If the average thickness $t_m$ of the magnetic layer 115 is within the above-described value range, the electromagnetic conversion characteristic is improved.

(Protective Layer)

The protective layer 116 includes, for example, a carbon material or silicon dioxide ($SiO_2$), and preferably includes a carbon material from the viewpoint of the film intensity of the protective layer 116. Examples of the carbon material include graphite, diamond-like carbon (DLC), or diamond.

(Lubricating Layer)

The lubricating layer 117 includes at least one lubricant. The lubricating layer 117 may further include, as necessary, various additives such as a rust-preventive agent. The lubricant has at least two carboxyl groups and one ester bond, and includes at least one carboxylic acid compound represented by the following general formula (1). The lubricant may further include another lubricant other than the carboxylic acid compound represented by the following general formula (1).

General formula (1)

[Chem. 1]

$$Rf\text{—}Es\text{—}R\text{—}\underset{\underset{CH_2\text{—}COOH}{|}}{CH}\text{—}COOH$$

(In the formula, Rf is an unsubstituted or substituted saturated or unsaturated fluorine-containing hydrocarbon group or a hydrocarbon group, Es is an ester bond, and R may be omitted, or is an unsubstituted or substituted saturated or unsaturated hydrocarbon group.)

The carboxylic acid compound is preferably represented by the following general formula (2) or (3).

General formula (2)

[Chem. 2]

$$Rf\text{—}\underset{\underset{O}{\|}}{C}\text{—}O\text{—}\underset{\underset{CH_2\text{—}COOH}{|}}{CH}\text{—}COOH$$

(In the formula, Rf is an unsubstituted or substituted saturated or unsaturated fluorine-containing hydrocarbon group or a hydrocarbon group.)

General formula (3)

[Chem. 3]

$$Rf\text{—}O\text{—}\underset{\underset{O}{\|}}{C}\text{—}CH_2\text{—}\underset{\underset{CH_2\text{—}COOH}{|}}{CH}\text{—}COOH$$

(In the formula, Rf is an unsubstituted or substituted saturated or unsaturated fluorine-containing hydrocarbon group or a hydrocarbon group.)

The lubricant preferably includes one or both of the carboxylic acid compounds represented by the general formulae (2) and (3).

If a lubricant containing the carboxylic acid compound represented by the general formula (1) is applied to, for example, the magnetic layer 115 or the protective layer 116, lubrication effect is expressed by cohesive force between the fluorine-containing hydrocarbon groups or hydrocarbon groups Rf which are hydrophobic groups. In a case where the Rf group is a fluorine-containing hydrocarbon group, the total carbon number is preferably 6 to 50, and the total carbon number of a fluorohydrocarbon group is preferably 4 to 20. The Rf group may be, for example, a saturated or unsaturated linear, branched, or cyclic hydrocarbon group, and may be preferably a saturated linear hydrocarbon group.

For example, in a case where the Rf group is a hydrocarbon group, the group is preferably the group represented by the following general formula (4).

General formula (4)

[Chem. 4]

$$CH_3\text{—}(CH_2)_l\text{—}$$

(Note that in the general formula (4), l is an integer selected from the range of 8 to 30 and more preferably 12 to 20.)

Additionally, in a case where the Rf group is a fluorine-containing hydrocarbon group, the group is preferably the group represented by the following general formula (5).

General formula (5)

[Chem. 5]

$$CF_3\text{—}(CF_2)_n\text{—}(CH_2)_m\text{—}$$

(Note that in the general formula (5), m and n are integers independently selected from the following ranges: m=2 to 20, n=3 to 18, and more preferably m=4 to 13, n=3 to 10, respectively.)

The fluorinated hydrocarbon group may be concentrated in one point in a molecule as depicted above, or dispersed as depicted in the following general formula (6), and may be, for example, $-CF_3$, $-CF_2-$, $-CHF_2-$, or $-CHF-$.

General formula (6)

[Chem. 6]

$$CF_3\text{—}(CF_2)_{n1}\text{—}(CH_2)_{m1}\text{—}(CF_2)_{n2}\text{—}(CH_2)_{m2}\text{—}$$

(Note that in the general formula (6), n1+n2=n and m1+m2=m.)

In the general formulae (4), (5), and (6), the reason that the carbon number is limited as described above is as follows. If the number of the carbon atoms composing an alkyl group or a fluorine-containing alkyl group (l or the sum of m and n) is not less than the above-described lower limit, the length is appropriate, cohesive force between hydrophobic groups is effectively exerted, good lubrication effect is developed, and friction and abrasion durability is improved. Additionally, if the carbon number is not more than the upper limit, the lubricant including the above-described carboxylic acid compound maintains good solubility in a solvent.

In particular, if the Rf groups in the general formulae (1), (2), and (3) include a fluorine atom, they are effective for reduction of the coefficient of friction and improvement of traveling properties. However, it is preferred that a hydrocarbon group be provided between a fluorine-containing hydrocarbon group and an ester bond to separate the fluorine-containing hydrocarbon group and the ester bond, thereby ensuring stability of the ester bond to prevent hydrolysis.

Additionally, the Rf group may have a fluoro alkyl ether group or a perfluoro polyether group.

The R group in the general formula (1) may be omitted, but if the group is present, it is preferably a hydrocarbon chain with a relatively small carbon number. Additionally, the Rf group or R group includes, as constitutional element, one or a plurality of elements selected from nitrogen, oxygen, sulfur, phosphorus, and halogen, and beside the above-described functional group, may further have, for example, a hydroxyl group, a carboxyl group, a carbonyl group, an amino group, and an ester bond.

Specifically, the carboxylic acid compound represented by the general formula (1) is preferably at least one of the compounds listed below. More specifically, the lubricant preferably includes at least one of the following compounds.

$CF_3(CF_2)_7 (CH_2)_{10}COOCH(COOH)CH_2COOH$
$CF_3(CF_2)_3 (CH_2)_{10}COOCH(COOH)CH_2COOH$
$C_{17}H_{35}COOCH(COOH)CH_2COOH$
$CF_3(CF_2)_7 (CH_2)_2OCOCH_2CH(C_{18}H_{37})COOCH(COOH)CH_2COOH$
$CF_3(CF_2)_7COOCH(COOH)CH_2COOH$
$CHF_2 (CF_2)_7COOCH(COOH)CH_2COOH$
$CF_3(CF_2)_7 (CH_2)_2COOCH_2CH(COOH)CH_2COOH$
$CF_3(CF_2)_7 (CH_2)_6COOCH_2CH(COOH)CH_2COOH$
$CF_3(CF_2)_7 (CH_2)_{11}COOCH_2CH(COOH)CH_2COOH$
$CF_3(CF_2)_3 (CH_2)_6COOCH_2CH(COOH)CH_2COOH$
$C_{18}H_{37}COOCH_2CH(COOH)CH_2COOH$
$CF_3(CF_2)_7(CH_2)_4COOCH(COOH)CH_2COOH$
$CF_3(CF_2)_3 (CH_2)_4COOCH(COOH)CH_2COOH$
$CF_3(CF_2)_3 (CH_2)_7COOCH(COOH)CH_2COOH$
$CF_3(CF_2)_9 (CH_2)_{10}COOCH(COOH)CH_2COOH$
$CF_3(CF_2)_7(CH_2)_{12}COOCH(COOH)CH_2COOH$
$CF_3(CF_2)_5(CH_2)_{10}COOCH(COOH)CH_2COOH$
$CF_3(CF_2)_7CH(C_9H_{19})CH_2CH=CH(CH_2)_7COOCH(COOH)CH_2COOH$
$CF_3(CF_2)_7CH(C_6H_{13})(CH_2)_7COOCH(COOH)CH_2COOH$
$CH_3 (CH_2)_3 (CH_2CH_2CH(CH_2CH_2 (CF_2)_9CF_3))_2 (CH_2)_7COOCH(COOH)CH_2COOH$

The carboxylic acid compound represented by the general formula (1) is soluble in a non-fluorine solvent having a low impact on the environment, and allows operations such as application, immersion, and spraying using a general-purpose solvent such as a hydrocarbon solvent, a ketone solvent, an alcohol solvent, and an ester solvent.

Specific examples of the general-purpose solvent include hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, and cyclohexanone.

In a case where the protective layer 116 includes a carbon material, if the carboxylic acid compound as a lubricant is applied to the protective layer 116, two carboxyl groups and at least one ester linking group, which are polar groups of the lubricant molecule, are adsorbed to the protective layer 116, and a lubricating layer 117 having particularly good durability is formed by cohesive force between the hydrophobic groups.

Note that the lubricant may be held as the lubricating layer 117 on the surface of the magnetic recording medium 110 as described above, or included and held in, for example, the magnetic layer 115 and the protective layer 116 composing the magnetic recording medium 110.

(Back Layer)

For the back layer 118, description about the back layer 14 in the first embodiment holds true.

(3) Physical Properties and Structure

All the descriptions about physical properties and structure given in 2.(3) hold true for the second embodiment. For example, the average thickness $t_T$, the dimensional variation $\Delta w$, the thermal expansion coefficient $\alpha$, the humidity expansion coefficient $\beta$, the Poisson's ratio $\rho$, the elastic limit value $\sigma_{MD}$ in the longitudinal direction, the coefficient of friction $\mu$ between the magnetic surface and the back surface, the surface roughness $R_{ab}$ of the back layer 118, and the surface roughness $R_{abe}$ of the base layer on the back layer side of the magnetic recording medium 110 may be similar to those in the first embodiment. Therefore, descriptions about the physical properties and structure of the magnetic recording medium according to the second embodiment are omitted.

(4) Configuration of Sputtering Apparatus

Figure 9:
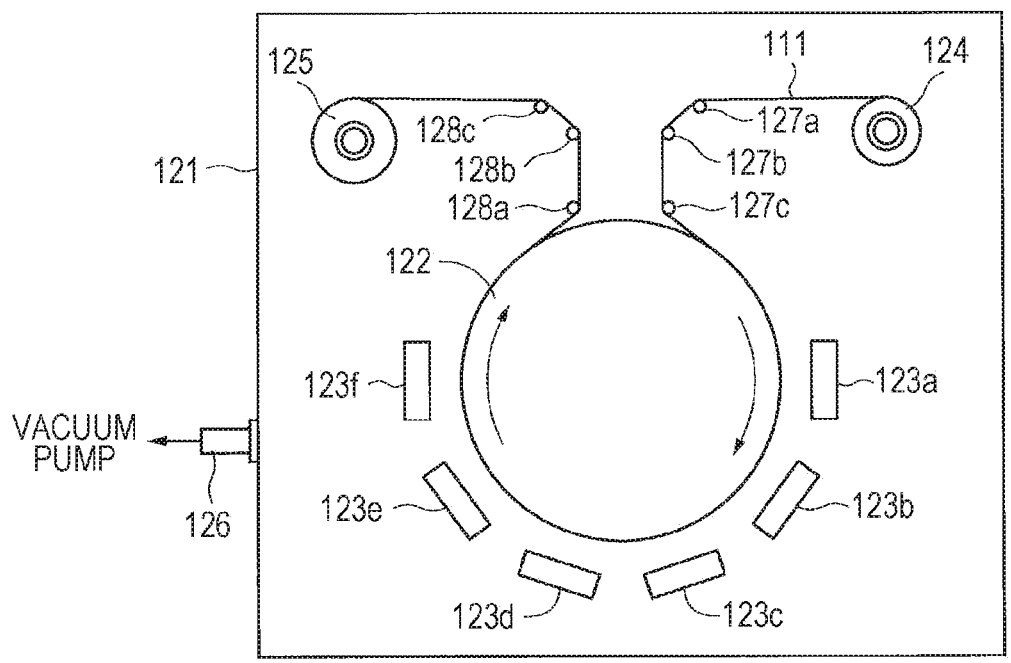
FIG. 9 is a schematic diagram depicting a configuration of a sputtering apparatus.

With reference to FIG. 9, an example of the configuration of a sputtering apparatus 120 used for producing the magnetic recording medium 110 according to the second embodiment is described below. The sputtering apparatus 120 is a sputtering apparatus of continuous winding type used for forming the SUL 112, the first seed layer 113A, the second seed layer 113B, the first primary layer 114A, the second primary layer 114B, and the magnetic layer 115, and includes, as depicted in FIG. 9, a deposition chamber 121, a drum 122 as a metal can (rotating body), cathodes 123a to 123f, a supply reel 124, a winding reel 125, and a plurality of guide rolls 127a to 127c and 128a to 128c. The sputtering apparatus 120 is, for example, an apparatus of direct current (DC) magnetron sputtering system, but the sputtering system will not be limited to this system.

The deposition chamber 121 is connected to a vacuum pump (not depicted) through an air exit 126, and the vacuum pump sets the atmosphere in the deposition chamber 121 at the predetermined degree of vacuum. In the deposition chamber 121, the drum 122 having a rotatable configuration, the supply reel 124, and the winding reel 125 are arranged. In the deposition chamber 121, the plurality of guide rolls 127a to 127c for guiding transfer of the base layer 111 between the supply reel 124 and the drum 122 is provided, and the plurality of guide rolls 128a to 128c for guiding transfer of the base layer 111 between the drum 122 and the winding reel 125 is provided. During sputtering, the base layer 111 wound off from the supply reel 124 is wound up by the winding reel 125 through the guide rolls 127a to 127c, the drum 122, and the guide rolls 128a to 128c. The drum 122 has a cylindrical shape, and the long base layer 111 is transferred along the circumference columnar surface of the drum 122. The drum 122 includes a cooling mechanism (not depicted), and is cooled to, for example, about −20° C. during sputtering. In the deposition chamber 121, the plu-

rality of cathodes 123*a* to 123*f* is arranged opposed to circumference surface of the drum 122. Each of these cathodes 123*a* to 123*f* has a target.

Specifically, the cathodes 123*a*, 123*b*, 123*c*, 123*d*, 123*e*, and 123*f* have targets for forming the SUL 112, the first seed layer 113A, the second seed layer 113B, the first primary layer 114A, the second primary layer 114B, and the magnetic layer 115, respectively. These cathodes 123*a* to 123*f* simultaneously form a plurality of kinds of films, more specifically, the SUL 112, the first seed layer 113A, the second seed layer 113B, the first primary layer 114A, the second primary layer 114B, and the magnetic layer 115.

The sputtering apparatus 120 having the above-described configuration continuously forms the SUL 112, the first seed layer 113A, the second seed layer 113B, the first primary layer 114A, the second primary layer 114B, and the magnetic layer 115 by the Roll to Roll method.

(5) Method for Producing Magnetic Recording Medium

The magnetic recording medium 110 according to the second embodiment may be produced, for example, as follows. Firstly, using the sputtering apparatus 120 depicted in FIG. 9, the SUL 112, the first seed layer 113A, the second seed layer 113B, the first primary layer 114A, the second primary layer 114B, and the magnetic layer 115 are formed in this order on the surface of the base layer 111. Specifically, these films are formed as follows. Firstly, the deposition chamber 121 is vacuumed to a predetermined pressure. Thereafter, the targets set on the cathodes 123*a* to 123*f* are sputtered while introducing a process gas such as Ar gas into the deposition chamber 121. As a result of this, the SUL 112, the first seed layer 113A, the second seed layer 113B, the first primary layer 114A, the second primary layer 114B, and the magnetic layer 115 are formed in this order on the surface of the traveling base layer 111.

The atmosphere in the deposition chamber 121 during sputtering is set at, for example, about $1 \times 10^{-5}$ Pa to $5 \times 10^{-5}$ Pa. The film thicknesses and characteristics of the SUL 112, the first seed layer 113A, the second seed layer 113B, the first primary layer 114A, the second primary layer 114B, and the magnetic layer 115 can be controlled by adjusting the tape line velocity of winding the base layer 111, the pressure of the process gas such as Ar gas introduced during sputtering (sputtering gas pressure), the input power, and the like.

Subsequently, the protective layer 116 is formed on the magnetic layer 115. The method for forming the protective layer 116 may be, for example, a chemical vapor deposition (CVD) method or a physical vapor deposition (PVD) method.

Subsequently, a binder, inorganic particles, a lubricant, and others are mixed with and dispersed in a solvent, thereby preparing a back layer forming paint.

Subsequently, the back layer forming paint is applied to the back surface of the base layer 111 and dried, thus forming the back layer 118 on the back surface of the base layer 111.

Subsequently, for example, a lubricant is applied to the protective layer 116, thus forming the lubricating layer 117. Application of the lubricant may use various application methods such as gravure coating and dip coating. Subsequently, as necessary, the magnetic recording medium 110 is cut to a predetermined width. In this manner, the magnetic recording medium 110 depicted in FIG. 8 is obtained.

(6) Effect

In the magnetic recording medium 110 according to the second embodiment, in a manner similar to the first embodiment, width change of the magnetic recording medium 110 can be suppressed by adjusting the tension of the magnetic recording medium 110 in the longitudinal direction with a recording and reproducing apparatus. For example, even if temperature and humidity change, which can cause width change of the magnetic recording medium 110, occurs, the width of the magnetic recording medium 110 is kept constant or generally constant. Furthermore, the magnetic recording medium 110 is as thin as $t_T$ 5.5 µm, but has marked handleability.

(7) Modification

The magnetic recording medium 110 may further include a primary layer between the base layer 111 and the SUL 112. The SUL 112 has an amorphous state, and thus does not have a role to promote epitaxial growth of the layer formed on the SUL 112, but may be required not to disturb the crystal orientation of the first and second primary layers 114A and 114B formed on the SUL 112. In order to achieve this, the soft magnetic material preferably has a fine structure which will not form a column. However, in a case where the influence of degassing such as moisture from the base layer 111 is considerable, the soft magnetic material may be coarsened to disturb the crystal orientation of the first and second primary layers 114A and 114B formed on the SUL 112. In order to suppress the influence of degassing such as moisture from the base layer 111, as described above, it is preferred that a primary layer, which includes an alloy containing Ti and Cr and has amorphous state, is provided between the base layer 111 and the SUL 112. Specific configuration of the primary layer may adopt the configuration similar to that of the first seed layer 113A of the second embodiment.

The magnetic recording medium 110 may not include at least one of the second seed layer 113B or the second primary layer 114B. However, from the viewpoint of improvement of SNR, it is more preferred that both of the second seed layer 113B and the second primary layer 114B be included.

The magnetic recording medium 110 may include APC-SUL (antiparallel coupled SUL) in place of single layer SUL.

4. Third Embodiment (Example of Magnetic Recording Medium of Vacuum Thin Film Type)

(Configuration of Magnetic Recording Medium)

Figure 10:
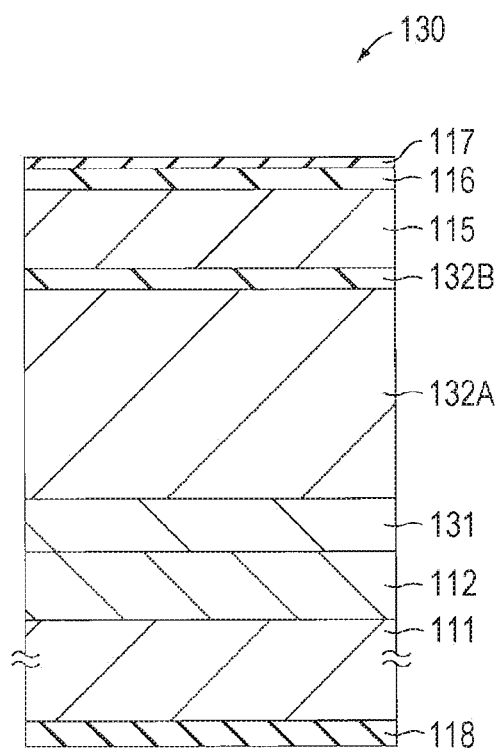
FIG. 10 is a cross sectional view depicting a configuration of a magnetic recording medium according to a third embodiment.

A magnetic recording medium 130 according to the third embodiment includes, as depicted in FIG. 10, a base layer 111, a SUL 112, a seed layer 131, a first primary layer 132A, a second primary layer 132B, and a magnetic layer 115. Note that, in the third embodiment, points similar to the second embodiment are indicated with the same reference numerals, and descriptions thereof are omitted. The SUL 112, the seed layer 131, and the first and second primary layers 132A and 132B are provided between the one main surface of the base layer 111 and the magnetic layer 115, and the SUL 112, the seed layer 131, the first primary layer 132A, and the second primary layer 132B are laminated in this order in a direction from the base layer 111 toward the magnetic layer 115.

(Seed Layer)

The seed layer 131 includes Cr, Ni, and Fe, has a face-centered cubic lattice (fcc) structure, and the (111) face of the face-centered cubic structure is preferentially oriented so as to be parallel to the surface of the base layer 111. The term preferential orientation means that the diffraction peak intensity from the (111) face of the face-centered cubic lattice structure is higher than the diffraction peak from other crystal face in the θ-2θ scanning by X-ray diffractometry, or only the diffraction peak intensity from the (111) face of the in face-centered cubic lattice structure is observed in the θ-2θ scanning by X-ray diffractometry.

The intensity ratio of X-ray diffraction of the seed layer 131 is preferably 60 cps/nm or more, more preferably 70 cps/nm or more, and even more preferably 80 cps/nm or more, from the viewpoint of improvement of SNR. Here, the intensity ratio of X-ray diffraction of the seed layer 131 is a value (I/D (cps/nm)) determined by dividing the intensity I (cps) of X-ray diffraction of the seed layer 131 by the average thickness D (nm) of the seed layer 131.

Cr, Ni, and Fe included in the seed layer 131 preferably have the average composition represented by the following formula (2).

$$Cr_x(Ni_YFe_{100-Y})_{100-X} \quad (2)$$

(Note that in the formula (2), X and Y are within the ranges of 10≤X≤45 and 60≤Y≤90.) If X is within the above-described range, the (111) orientation of the face-centered cubic lattice structure of Cr, Ni, and Fe improves, whereby better SNR is obtained. In a similar way, if Y is within the above-described range, the (111) orientation of the face-centered cubic lattice structure of Cr, Ni, and Fe improves, whereby better SNR is obtained.

The average thickness of the seed layer 131 is preferably 5 nm or more and 40 nm or less. If the average thickness of the seed layer 131 is within this range, the (111) orientation of the face-centered cubic lattice structure of Cr, Ni, and Fe improves, whereby better SNR is obtained. Note that the average thickness of the seed layer 131 is determined in a manner similar to that of the magnetic layer 13 in the first embodiment. However, the magnification of the TEM image is adjusted as appropriate according to the thickness of the seed layer 131.

(First and Second Primary Layers)

The first primary layer 132A includes Co and O having a face-centered cubic lattice structure, and has a column (columnar crystal) structure. The first primary layer 132A including Co and O achieves an effect (function) almost similar to that of the second primary layer 132B including Ru. The concentration ratio of the average atom concentration of O to the average atom concentration of Co ((average atom concentration of O)/(average atom concentration of Co)) is 1 or more. If the concentration ratio is 1 or more, the effect of providing the first primary layer 132A improves, whereby better SNR is obtained.

The column structure is preferably inclined from the viewpoint of improvement of SNR. The direction of the incline is preferably the longitudinal direction of the long magnetic recording medium 130. The reason for the preference for the longitudinal direction is as follows. The magnetic recording medium 130 according to the present embodiment is a magnetic recording medium for so-called linear recording, and the recording track is parallel to the longitudinal direction of the magnetic recording medium 130. Additionally, the magnetic recording medium 130 according to the present embodiment is also a so-called vertical magnetic recording medium, and a crystal orientation axis of the magnetic layer 115 is preferably vertical direction from the viewpoint of recording characteristics, but the crystal orientation axis of the magnetic layer 115 may be declined by the influence of the decline of the column structure of the first primary layer 132A. In the magnetic recording medium 130 for linear recording, in consideration of the relationship with the head magnetic field during recording, the configuration in which the crystal orientation axis of the magnetic layer 115 is inclined in the longitudinal direction of the magnetic recording medium 130 reduces the influence of the inclination of the crystal orientation axis on recording characteristics in comparison with the configuration in which the crystal orientation axis of the magnetic layer 115 is inclined in the width direction of the magnetic recording medium 130. In order to incline the crystal orientation axis of the magnetic layer 115 in the longitudinal direction of the magnetic recording medium 130, as described above, the inclination direction of the column structure of the first primary layer 132A is preferably the longitudinal direction of the magnetic recording medium 130.

An inclination angle of the column structure is preferably more than 0° and 60° or less. If the inclination angle is more than 0° and 60° or less, the tip shape of the column included in the first primary layer 132A is markedly changed to become a generally triangle shape, so that the effect of the granular structure increases, the noise reduces, and the SNR tends to improve. On the other hand, if the inclination angle is more than 60°, the tip shape of the column included in the first primary layer 132A is little changed and hard to form a generally triangle shape, so that a noise reduction effect tends to decrease.

The average particle size of the column structure is 3 nm or more and 13 nm or less. If the average particle size is less than 3 nm, the average particle size of the column structure included in the magnetic layer 115 decreases, so that the capacity of the current magnetic material for holding recording may decrease. On the other hand, if the average particle size is 13 nm or less, noise is suppressed, and better SNR is obtained. The average thickness of the first primary layer 132A is preferably 10 nm or more and 150 nm or less. If the average thickness of the first primary layer 132A is 10 nm or more, the (111) orientation of the face-centered cubic lattice structure of the first primary layer 132A improves, and better SNR is obtained. On the other hand, if the average thickness of the first primary layer 132A is 150 nm or less, the increase of the particle size of column is suppressed. Accordingly, noise is suppressed, better SNR is obtained. Note that the average thickness of the first primary layer 132A is determined in a manner similar to that of the magnetic layer 13 in the first embodiment. However, the magnification of the TEM image is adjusted as appropriate according to the thickness of the first primary layer 132A.

The second primary layer 132B preferably has a crystal structure similar to that of the magnetic layer 115. In a case where the magnetic layer 115 includes a Co alloy, the second primary layer 132B preferably includes a material having a hexagonal close-packed (hcp) structure similar to that of the Co alloy, and the c axis of the structure is preferably oriented in a vertical direction (more specifically film thickness direction) relative to the film surface. This improves orientation of the magnetic layer 115, and achieves relatively good matching of the lattice constants of the second primary layer 132B and the magnetic layer 115. The material having a hexagonal close-packed structure is preferably a Ru-containing material, specifically single Ru or a Ru alloy. Examples of the Ru alloy include Ru alloy oxides such as Ru—SiO$_2$, Ru—TiO$_2$, or Ru—ZrO$_2$.

The average thickness of the second primary layer 132B may be smaller than that of a primary layer (for example, a Ru-containing primary layer) in a common magnetic recording medium, and may be, for example, 1 nm or more and 5 nm or less. Since the seed layer 131 and the first primary layer 132A having the above-described configurations are provided below the second primary layer 132B, so that good SNR is obtained even if the average thickness of the second primary layer 132B is small as described above. Note that the average thickness of the second primary layer 132B is determined in a manner similar to that of the magnetic layer 13 in the first embodiment. However, the magnification of the TEM image is adjusted as appropriate according to the thickness of the second primary layer 132B.

(Effect)

In the magnetic recording medium 130 according to the third embodiment, in a manner similar to the first embodiment, the width of the magnetic recording medium 10 can be kept constant or generally constant through the adjustment of the tension of the magnetic recording medium 10 in the longitudinal direction.

The magnetic recording medium 130 according to the third embodiment includes the seed layer 131 and the first primary layer 132A between the base layer 111 and the second primary layer 132B. The seed layer 131 includes Cr, Ni, and Fe, has a face-centered cubic lattice structure, and the (111) face of the face-centered cubic structure is preferentially oriented so as to be parallel to the surface of the base layer 111. The first primary layer 132A includes Co and O, the ratio of the average atom concentration of O to the average atom concentration of Co is 1 or more, and has a column structure with an average particle size of 3 nm or more and 13 nm or less. This allows the thickness of the second primary layer 132B to be reduced and minimizes the use of a costly material Ru, and allows the magnetic layer 115 having good crystal orientation and high antimagnetic force to be provided.

Ru included in the second primary layer 132B has the same hexagonal close-packed lattice structure as Co, which is the main component of the magnetic layer 115. Therefore, Ru improves crystal orientation and promotes granular properties of the magnetic layer 115. Additionally, in order to further improve crystal orientation of Ru included in the second primary layer 132B, the first primary layer 132A and the seed layer 131 are provided below the second primary layer 132B. In the magnetic recording medium 130 according to the third embodiment, the first primary layer 132A containing low-cost CoO having a face-centered cubic lattice structure achieves an effect (function) almost similar to the second primary layer 132B containing Ru. This allows reduction of the thickness of the second primary layer 132B.

Additionally, in order to increase crystal orientation of the first primary layer 132A, the seed layer 131 containing Cr, Ni, and Fe is provided.

5. Examples

The present technology is specifically described by examples, but the present technology will not be limited to these examples.

In the following examples and comparative examples, the average thickness $t_T$ of the magnetic tape, the dimensional variation $\Delta w$ of the magnetic tape in the width direction to the tension change of the magnetic tape in the longitudinal direction, the thermal expansion coefficient $\alpha$ of the magnetic tape, the humidity expansion coefficient $\beta$ of the magnetic tape, the Poisson's ratio $\rho$ of the magnetic tape, the elastic limit value $\sigma_{MD}$ of the magnetic tape in the longitudinal direction, the average thickness $t_m$ of the magnetic layer, the squareness ratio S2, the average thickness $t_b$ of the back layer, the surface roughness $R_{ab}$ of the back layer, and the interlayer coefficient of friction p between the magnetic surface and the back surface are the values obtained by the measurement method described in the first embodiment. As will be described later, however, in Example 11, the velocity V in measurement of the elastic limit value $\sigma_{MD}$ in the longitudinal direction was a value different from that obtained by the measurement method described in the first embodiment.

Example 1

(Preparation Process of Magnetic Layer Forming Paint)

A magnetic layer forming paint was prepared as follows. Firstly, a first composition of the following recipe was kneaded with an extruder. Subsequently, the kneaded first composition and a second composition of the following recipe were placed in a stirring tank equipped with a disperser, and subjected to preliminary mixing. Subsequently, sand mill mixing was further carried out, filter treatment was carried out, thus preparing a magnetic layer forming paint.

(First Composition)
Powder of ε-iron oxide nanoparticles (ε-$Fe_2O_3$ crystal particles): 100 parts by mass
Vinyl chloride resin (cyclohexanone solution 30% by mass): 10 parts by mass (degree of polymerization 300, Mn=10000, containing $OSO_3K$=0.07 mmol/g and secondary OH=0.3 mmol/g as polar groups)
Aluminum oxide powder: 5 parts by mass
(α-$Al_2O_3$, average particle size 0.2 μm)
Carbon black: 2 parts by mass
(trade name: SEAST TA, Tokai Carbon Co., Ltd.)
(Second Composition)
Vinyl chloride resin: 1.1 parts by mass
(resin solution: resin component 30% by mass, cyclohexanone 70% by mass)
n-butyl stearate: 2 parts by mass
Methyl ethyl ketone: 121.3 parts by mass
Toluene: 121.3 parts by mass
Cyclohexanone: 60.7 parts by mass Finally, to the magnetic layer forming paint prepared as described above, as curing agents, 4 parts by mass of polyisocyanate (trade name: COLONATE L, Nippon Polyurethane Industry Co., Ltd.) and 2 parts by mass of myristic acid were added.

(Preparation Process of Primary Layer Forming Paint)

A primary layer forming paint was prepared as follows. Firstly, a third composition of the following recipe was kneaded with an extruder. Subsequently, the kneaded third composition and a fourth composition of the following recipe were placed in a stirring tank equipped with a disperser, and subjected to preliminary mixing. Subsequently, the object was further subjected to sand mill mixing, filtered, thus preparing a primary layer forming paint.

(Third composition)
Needle-shaped iron oxide powder: 100 parts by mass
(α-$Fe_2O_3$, average major axis length 0.15 μm)
Vinyl chloride resin: 55.6 parts by mass
(Resin solution: resin component 30% by mass, cyclohexanone 70% by mass)
Carbon black: 10 parts by mass
(Average particle size 20 nm)
(Fourth Composition)
Polyurethane resin UR8200 (Toyobo Co., Ltd.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Finally, to the primary layer forming paint prepared as described above, as curing agents, 4 parts by mass of polyisocyanate (trade name: COLONATE L, Nippon Polyurethane Industry Co., Ltd.) and 2 parts by mass of myristic acid were added.

(Preparation Process of Back Layer Forming Paint)

A back layer forming paint was prepared as follows. The following raw materials were mixed with a stirring tank equipped with a disperser, and filtered, thereby preparing a back layer forming paint.

Carbon black (Asahi Carbon Co., Ltd., trade name: #80): 100 parts by mass
Polyester polyurethane: 100 parts by mass
(Nippon Polyurethane Industry Co., Ltd., trade name: N-2304)
Methyl ethyl ketone: 500 parts by mass
Toluene: 400 parts by mass
Cyclohexanone: 100 parts by mass (Deposition Process)

Using the paints prepared as described above, a primary layer having an average thickness of 1.0 μm, and a magnetic layer having an average thickness $t_m$ of 90 nm were formed as follows on a long polyethylene naphthalate film (hereinafter referred to as "PEN film") as a non-magnetic support. Firstly, on the film, the primary layer forming paint was applied and dried, thereby forming a primary layer on the film. Subsequently, on the primary layer, the magnetic layer forming paint was applied and dried, thereby forming a magnetic layer on the primary layer. Note that, in drying of the magnetic layer forming paint, the magnetic field of the magnetic powder was oriented in the thickness direction of the film using a solenoid coil. Additionally, the time of application of a magnetic field to the magnetic layer forming paint was adjusted so as to set the squareness ratio S2 of the magnetic tape in the thickness direction (vertical direction) at 65%.

Subsequently, to the film having the primary layer and the magnetic layer, a back layer having an average thickness $t_b$ of 0.6 μm was applied and dried. Then, the film having the primary layer, the magnetic layer, and the back layer was subjected to curing treatment. Subsequently, the film was subjected to calendar processing, thereby smoothening the surface of the magnetic layer. At this time, the conditions (temperature) of calendar processing were adjusted so as to achieve an interlayer coefficient of friction μ of about 0.5 between the magnetic surface and the back surface, and then the film was subjected to re-curing treatment, thus obtaining a magnetic tape having an average thickness $t_T$ of 5.5 μm.

(Cutting Process)

The magnetic tape obtained as described above was cut to a ½-inch (12.65 mm) width, and wound on a core, thus obtaining a pancake.

The magnetic tape obtained as described above had the characteristics given in Table 1. For example, the dimensional variation ΔW of the magnetic tape was 705 ppm/N, and the surface roughness $R_{abe}$ of the base layer on the back layer side was 6.2 nm.

Example 2

A magnetic tape was obtained in the same manner as in Example 1, except that the thickness of the PEN film was decreased than that in Example 1 so as to achieve a dimensional variation Δw of 750 ppm/N. The average thickness of the magnetic tape was 5 μm.

Example 3

A magnetic tape was obtained in the same manner as in Example 1, except that the thickness of the PEN film was decreased and the average thicknesses of the back layer and the primary layer were decreased from those in Example 1 so as to achieve a dimensional variation Δw of 800 ppm/N. The average thickness of the magnetic tape was 4.5 μm. Additionally, along with the further thinning of the back layer, the surface roughness $R_{ab}$ of the back layer increased.

Example 4

A magnetic tape was obtained in the same manner as in Example 1, except that the thickness of the PEN film was decreased and the average thicknesses of the back layer and the primary layer were decreased from those in Example 1, and the curing treatment conditions of the film having the primary layer, the magnetic layer, and the back layer were adjusted so as to achieve a dimensional variation Δw of 800 ppm/N.

Example 5

A magnetic tape was obtained in the same manner as in Example 4, except that the composition of the primary layer forming paint was changed so as to achieve a thermal expansion coefficient α of 8 ppm/° C.

Example 6

A magnetic tape was obtained in the same manner as in Example 4, except that a thin barrier layer was formed on both surfaces of the PEN film so as to achieve a humidity expansion coefficient β of 3 ppm/% RH.

Example 7

A magnetic tape was obtained in the same manner as in Example 4, except that the composition of the back layer forming paint was changed so as to achieve a Poisson's ratio ρ of 0.31.

Example 8

A magnetic tape was obtained in the same manner as in Example 4, except that the composition of the back layer forming paint was changed so as to achieve a Poisson's ratio ρ of 0.35.

Example 9

A magnetic tape was obtained in the same manner as in Example 7, except that the curing conditions for the film having a primary layer, a magnetic layer, and a back layer were changed so as to achieve an elastic limit value $\sigma_{MD}$ of 0.8 N in the longitudinal direction.

Example 10

A magnetic tape was obtained in the same manner as in Example 7, except that the curing conditions and the re-curing conditions for the film having the primary layer, the magnetic layer, and the back layer were changed so as to achieve an elastic limit value $\sigma_{MD}$ of 3.5 N in the longitudinal direction.

Example 11

A magnetic tape was obtained in a similar manner as in Example 9. Then, the elastic limit value $\sigma_{MD}$ of the magnetic tape thus obtained was measured with the velocity V in measuring the elastic limit value $\sigma_{MD}$ in the longitudinal direction changed to 5 mm/min. As a result of this, the elastic limit value $\sigma_{MD}$ in the longitudinal direction was 0.8, which was not different from the elastic limit value $\sigma_{MD}$ in the longitudinal direction when the velocity V was 0.5 mm/min (Example 9).

Example 12

A magnetic tape was obtained in the same manner as in Example 7, except that the coating thickness of the magnetic layer forming paint was changed so as to achieve an average thickness $t_m$ of the magnetic layer of 40 nm.

Example 13

(SUL Deposition Process)
Firstly, a CoZrNb layer (SUL) with an average thickness of 10 nm was deposited on the surface of a long polymer film as a non-magnetic support under the following deposition conditions. Note that a PEN film was used as the polymer film.
Film formation system: DC magnetron sputtering system
Target: CoZrNb target
Gas type: Ar
Gas pressure: 0.1 Pa
(Deposition Process of First Seed Layer)
Subsequently, under the following deposition conditions, a TiCr layer having an average thickness of 5 nm (first seed layer) was deposited on the CoZrNb layer.
Sputtering system: DC magnetron sputtering system
Target: TiCr target
Ultimate vacuum: $5\times10^{-5}$ Pa
Gas type: Ar
Gas pressure: 0.5 Pa
(Deposition Process of Second Seed Layer)
Subsequently, under the following deposition conditions, a NiW layer having an average thickness of 10 nm (second seed layer) was deposited on the TiCr layer.
Sputtering system: DC magnetron sputtering system
Target: NiW target
Ultimate vacuum: $5\times10^{-5}$ Pa
Gas type: Ar
Gas pressure: 0.5 Pa
(Deposition Process for First Primary Layer)
Subsequently, under the following deposition conditions, a Ru layer having an average thickness of 10 nm (first primary layer) was deposited on the NiW layer.
Sputtering system: DC magnetron sputtering system
Target: Ru target
Gas type: Ar
Gas pressure: 0.5 Pa
(Deposition Process for Second Primary Layer)
Subsequently, under the following deposition conditions, a Ru layer having an average thickness of 20 nm (second primary layer) was deposited on the Ru layer.
Sputtering system: DC magnetron sputtering system
Target: Ru target
Gas type: Ar
Gas pressure: 1.5 Pa
(Deposition Process for Magnetic Layer)
Subsequently, under the following deposition conditions, a $(CoCrPt)$—$(SiO_2)$ layer having an average thickness 9 nm (magnetic layer) was deposited on the Ru layer.
Deposition system: DC magnetron sputtering system
Target: $(CoCrPt)$—$(SiO_2)$ target
Gas type: Ar
Gas pressure: 1.5 Pa
(Deposition Process for Protective Layer)
Subsequently, under the following deposition conditions, a carbon layer (protective layer) having an average thickness of 5 nm was deposited on the magnetic layer.
Deposition system: DC magnetron sputtering system
Target: carbon target
Gas type: Ar
Gas pressure: 1.0 Pa
(Deposition Process for Lubricating Layer)
Subsequently, a lubricant was applied to the protective layer, thus forming a lubricating layer.
(Deposition Process for Back Layer)
Subsequently, on a surface opposite to the magnetic layer, a back layer forming paint was applied and dried, thereby forming a back layer having an average thickness of 0.3 μm. As a result of this, a magnetic tape having an average thickness of 4.0 μm was obtained.
(Cutting Process)
The magnetic tape obtained as described above was cut to a ½-inch (12.65 mm) width.
The magnetic tape obtained as described above had the characteristics given in Table 1. For example, the dimensional variation ΔW of the magnetic tape was 800 ppm/N, and the surface roughness $R_{abe}$ of the base layer on the back layer side was 6.2 nm.

Example 14

A magnetic tape was obtained in the same manner as in Example 7, except that the thickness of the back layer was changed to 0.2 μm. The average thickness of the magnetic tape was 4.4 μm.

Example 15

A magnetic tape was obtained in the same manner as in Example 7, except that the surface roughness $R_{abe}$ of the base layer on the back layer side was decreased to 5.1 nm. The decrease of the surface roughness $R_{abe}$ was due to the adjustment of the amount of the inorganic filler included in PEN as the base layer. With the decrease of the surface roughness $R_{abe}$, the surface roughness $R_{ab}$ of the back layer decreased to 3.2 nm, and the coefficient of friction μ increased.

Example 16

A magnetic tape was obtained in the same manner as in Example 7, except that the coating thickness of the magnetic layer forming paint was changed so as to achieve an average thickness $t_n$ of the magnetic layer of 110 nm.

Example 17

A magnetic tape was obtained in the same manner as in Example 7, except that the surface roughness $R_{abe}$ of the base layer on the back layer side was increased. The increase of the surface roughness $R_{abe}$ was due to the adjustment of the amount of the inorganic filler included in PEN as the base layer. With the increase of the surface roughness $R_{abe}$, the surface roughness $R_{ab}$ of the back layer increased, and the coefficient of friction μ decreased.

Example 18

A magnetic tape was obtained in the same manner as in Example 7, except that the time of application of a magnetic field to the magnetic layer forming paint was adjusted so as to set the squareness ratio S2 of the magnetic tape in the thickness direction (vertical direction) at 73%.

Example 19

A magnetic tape was obtained in the same manner as in Example 7, except that the time of application of a magnetic field to the magnetic layer forming paint was adjusted so as to set the squareness ratio S2 of the magnetic tape in the thickness direction (vertical direction) at 80%.

Example 20

A magnetic tape was obtained in the same manner as in Example 7, except that the curing conditions and re-curing conditions for the film having the primary layer, the magnetic layer, and the back layer were adjusted so as to achieve an elastic limit value $\sigma_{MD}$ of 5.0 N in the longitudinal direction.

Example 21

A magnetic tape was obtained in the same manner as in Example 7, except that barium ferrite ($BaFe_{12}O_{19}$) nanoparticles were used in place of ε-iron oxide nanoparticles.

Example 22

A magnetic tape was obtained in the same manner as in Example 21, except that a PEN film having a higher stretch strength in the width direction was used in place of the PEN film used in Example 21, and the surface roughness $R_{ab}$ of the back layer was changed. The replacement of the PEN film decreased the dimensional variation ΔW as compared with that of the magnetic tape of Example 21, and the dimensional variation ΔW of the magnetic tape of Example 22 was 670 ppm/N.

Comparative Example 1

A magnetic tape was obtained in the same manner as in Example 1, except that tensilization of the PEN film was changed so as to achieve a dimensional variation ΔW of 650 [ppm/N].

Comparative Example 2

A magnetic tape was obtained in the same manner as in Example 7, except that the surface roughness $R_{abe}$ of the base layer on the back layer side was decreased to 3.9 nm. The decrease of the surface roughness $R_{abe}$ was due to the adjustment of the amount of the inorganic filler included in PEN as the base layer. With the decrease of the surface roughness $R_{abe}$, the surface roughness $R_{ab}$ of the back layer decreased to 2.8 nm, and the coefficient of friction μ increased.

Comparative Example 3

A magnetic tape was obtained in the same manner as in Example 7, except that the surface roughness $R_{abe}$ of the base layer on the back layer side was increased to 9.6 nm. The increase of the surface roughness $R_{abe}$ was due to the adjustment of the amount of the inorganic filler included in PEN as the base layer. With the increase of the surface roughness $R_{abe}$, the surface roughness $R_{ab}$ of the back layer increased to 7.8 nm, and the coefficient of friction μ decreased.

Comparative Example 4

A magnetic tape was obtained in the same manner as in Example 7, except that the surface roughness $R_{abe}$ of the base layer on the back layer side was increased to 10.5 nm. The increase of the surface roughness $R_{abe}$ was due to the adjustment of the amount of the inorganic filler included in PEN as the base layer. With the increase of the surface roughness $R_{abe}$, the surface roughness $R_{ab}$ of the back layer increased to 8.8 nm, and the coefficient of friction μ decreased.

Comparative Example 5

A magnetic tape was obtained in the same manner as in Example 21, except that a PEN film having a higher stretch strength in the width direction was used in place of the PEN film used in Example 21, and the surface roughness $R_{ab}$ of the back layer was changed. The replacement of the PEN film decreased the dimensional variation ΔW as compared with that of the magnetic tape of Example 21. The dimensional variation ΔW of the magnetic tape of Comparative Example 5 was 630 ppm/N, which was further lower than the dimensional variation ΔW of the magnetic tape of Example 22.

(Judgement of Tape Width Variation)

Firstly, a cartridge sample incorporating a magnetic tape having a width of ½ inches was provided. In the cartridge sample, the magnetic tape is wound around the reel included in the cartridge case. Note that, on the magnetic tape, two or more lines of magnetic pattern in an inverted V shape were preliminarily recorded in parallel to the longitudinal direction at known intervals (hereinafter referred to as "known interval of magnetic pattern lines in preliminary recording). Subsequently, the cartridge sample was reciprocally traveled with the recording and reproducing apparatus. Then, during the reciprocal traveling, two or more of the magnetic pattern lines in an inverted V shape were simultaneously reproduced, and the interval of the magnetic pattern line during traveling was continuously measured from the shape of the reproduction waveform of each line. Additionally, during traveling, on the basis of the interval information of the magnetic pattern line thus measured, the rotational driving of the spindle driving apparatus and the reel driving apparatus is controlled, and the tension of the magnetic tape in the longitudinal direction was automatically adjusted in such a manner that the interval of the magnetic pattern line was the desired width, or generally the desired width. All the measurements of one reciprocation of the interval of the magnetic pattern lines were simply averaged and set as "the interval between the measured magnetic pattern lines", and the difference from "the distance of known magnetic pattern lines which have been recorded" was set as "change of tape width".

Additionally, the reciprocal traveling by the recording and reproducing apparatus was carried out in a thermohygrostat bath. The speed of the reciprocal traveling was 5 m/sec. The temperature and humidity during reciprocal traveling were gradually and repeatedly changed independent from the above-described reciprocal traveling, according to a preset environmental change program (10° C., 10%→29° C., 80%→10° C., 10% is repeated twice. 10° C., 10% is changed to 29° C., 80% over a period of two hours, and 29°

C., 80% is changed to 10° C., 10% over a period of two hours) in the temperature range of 10° C. to 45° C. and the relative humidity range of 10% to 80%. This evaluation was repeated until the "preset environmental variation program" was completed. After completion of the evaluation, the average (simple average) was calculated using all the absolute values of each "change of tape width" obtained in each reciprocation, and the value was recorded as "variation of effective tape width" of the tape. The judgement according to alienation of the "variation of effective tape width" from the ideal (preferably as small as possible) was carried out on each tape, and eight grades were given. Note that the grade "8" is the most desirable grade, and the grade "1" is the most undesirable grade. In the magnetic tape evaluated as any of the eight grades, any of the following states is observed during tape traveling.

8: No abnormality occurs.
7: A mild increase of the error rate is observed during traveling.
6: A heavy increase of the error rate is observed during traveling.
5: Servo signal is not read during traveling, and mild reloading (one to two times) is necessary.
4: Servo signal is not read during traveling, and moderate reloading (within ten times) is necessary.
3: Servo signal is not read during traveling, and heavy reloading (more than ten times) is necessary.
2: Servo is not read, and traveling occasionally stops because of system error.
1: Servo is not read, and traveling instantly stops because of system error.

(Evaluation of Electromagnetic Conversion Characteristic)

Firstly, using a loop tester (Microphysics), a reproducing signal of the magnetic tape was acquired. The conditions for acquiring the reproducing signal are given below.
Head: GMR
Head speed: 2 m/s
Signal: single recording frequency (10 MHz)
Recording current: optimum recording current Subsequently, the reproducing signal was taken with a spectrum analyzer at a span of 0 to 20 MHz (resolution band width=100 kHz, VBW=30 kHz). Subsequently, the peak of the spectrum thus taken was recorded as the signal amount S, and the floor noise excluding the peak was summed up to obtain the noise amount N, and the ratio of the signal amount S to the noise amount N (S/N) was obtained as the signal-to-noise ratio (SNR).

Subsequently, the SNR thus obtained was converted to a relative value (dB) based on the SNR of Comparative Example 1 as the reference medium. Subsequently, using the SNR (dB) obtained as described above, the quality of the electromagnetic conversion characteristic was judged as follows.

Better: the SNR of the magnetic tape is 1 dB or more higher than the SNR (=0 (dB)) of the evaluation reference sample (Comparative Example 1).

Good: the SNR of the magnetic tape is equivalent to the SNR (=0 (dB)) of the evaluation reference sample (Comparative Example 1), or more than the SNR (=0 (dB)).

Bad: the SNR of the magnetic tape is less than the SNR (=0 (dB)) of the evaluation reference sample (Comparative Example 1).

(Evaluation of Winding Deviation)

Firstly, the cartridge sample after "judgement of tape width variation" was provided. Subsequently, the reel wound with the tape was taken out from the cartridge, and the end surface of the wound tape was visually observed. Note that the reel has flanges, and at least one of the flanges is transparent or translucent, so that the internal state of the wound tape can be observed through the flange.

In the observation, in a case where the end surface of the tape is not flat, and a level difference or projecting of the tape is found, the tape is judged to have a winding deviation. Additionally, the degree of "winding deviation" was graded lower with the increase of the number of such level differences and projecting of the tape. The above-described judgement was carried out for each sample. The winding deviation condition of each sample was compared with the winding deviation condition of Comparative Example 1 as a reference medium, and the quality was judged as follows.

Good: Winding deviation condition of the sample is equivalent to or lighter than the winding deviation condition of the reference sample (Comparative Example 1)

Bad: Winding deviation condition of the sample is heavier than the winding deviation condition of the reference sample (Comparative Example 1)

Table 1 lists the configurations and evaluation results of the magnetic tapes of Examples 1 to 22 and Comparative Examples 1 to 5.

TABLE 1

| | Magnetic body | Base layer thickness (μm) | $t_T$ (μm) | ΔW (ppm/N) | α (ppm/°C) | β (ppm/% RH) | ρ | $σ_{MD}$ (N) | V (mm/min) | $t_m$ (nm) | S2 (%) | $t_b$ (μm) | $R_{ab}$ (nm) | $R_{abc}$ (nm) | μ | Rating | Electromagnetic conversion characteristic | Winding deviation |
|---|---|---|---|---|---|---|---|---|---|---|---|---|---|---|---|---|---|---|
| Example 1 | ε iron oxide | 3.8 | 5.5 | 705 | 5.9 | 5.2 | 0.29 | 0.75 | 0.5 | 90 | 65 | 0.6 | 5.2 | 6.2 | 0.53 | 4 | Good | Good |
| Example 2 | ε iron oxide | 3.3 | 5 | 750 | 5.9 | 5.2 | 0.29 | 0.75 | 0.5 | 90 | 65 | 0.6 | 5.2 | 6.2 | 0.53 | 5 | Good | Good |
| Example 3 | ε iron oxide | 3.2 | 4.5 | 800 | 5.9 | 5.2 | 0.29 | 0.75 | 0.5 | 90 | 65 | 0.3 | 5.7 | 6.2 | 0.48 | 6 | Good | Good |
| Example 4 | ε iron oxide | 3.2 | 4.5 | 800 | 6.0 | 5.0 | 0.29 | 0.75 | 0.5 | 90 | 65 | 0.3 | 5.7 | 6.2 | 0.48 | 7 | Good | Good |
| Example 5 | ε iron oxide | 3.2 | 4.5 | 800 | 8.0 | 5.0 | 0.29 | 0.75 | 0.5 | 90 | 65 | 0.3 | 5.7 | 6.2 | 0.48 | 7 | Good | Good |
| Example 6 | ε iron oxide | 3.2 | 4.6 | 800 | 6.0 | 3.0 | 0.29 | 0.75 | 0.5 | 90 | 65 | 0.3 | 5.7 | 6.2 | 0.48 | 8 | Good | Good |
| Example 7 | ε iron oxide | 3.2 | 4.5 | 800 | 6.0 | 5.0 | 0.31 | 0.7 | 0.5 | 90 | 65 | 0.3 | 5.7 | 6.2 | 0.48 | 7 | Good | Good |
| Example 8 | ε iron oxide | 3.2 | 4.5 | 800 | 6.0 | 5.0 | 0.35 | 0.8 | 0.5 | 90 | 65 | 0.3 | 5.7 | 6.2 | 0.48 | 7 | Good | Good |
| Example 9 | ε iron oxide | 3.2 | 4.5 | 800 | 6.0 | 5.0 | 0.31 | 3.5 | 0.5 | 90 | 65 | 0.3 | 5.7 | 6.2 | 0.48 | 8 | Good | Good |
| Example 10 | ε iron oxide | 3.2 | 4.5 | 800 | 6.0 | 5.0 | 0.31 | 0.8 | 5 | 90 | 65 | 0.3 | 5.7 | 6.2 | 0.48 | 8 | Good | Good |
| Example 11 | ε iron oxide | 3.2 | 4.5 | 800 | 6.0 | 5.0 | 0.31 | 0.75 | 0.5 | 90 | 65 | 0.3 | 5.7 | 6.2 | 0.48 | 8 | Good | Good |
| Example 12 | ε iron oxide | 3.2 | 4.4 | 800 | 6.0 | 5.0 | 0.31 | 0.75 | 0.5 | 40 | 65 | 0.3 | 5.7 | 6.2 | 0.48 | 7 | Good | Good |
| Example 13 | CoPtCrSi alloy | 3.6 | 4 | 800 | 6.0 | 5.0 | 0.31 | 0.75 | 0.5 | 9 | 98 | 0.2 | 5.7 | 6.2 | 0.48 | 7 | Good | Good |
| Example 14 | ε iron oxide | 3.2 | 4.4 | 800 | 6.0 | 5.0 | 0.31 | 0.75 | 0.5 | 90 | 65 | 0.3 | 5.7 | 6.2 | 0.48 | 7 | Good | Good |
| Example 15 | ε iron oxide | 3.2 | 4.5 | 800 | 6.0 | 5.0 | 0.31 | 0.75 | 0.5 | 90 | 65 | 0.3 | 3.2 | 5.1 | 0.78 | 7 | Good | Good |
| Example 16 | ε iron oxide | 3.2 | 4.5 | 800 | 6.0 | 5.0 | 0.31 | 0.75 | 0.5 | 110 | 65 | 0.3 | 5.7 | 6.2 | 0.48 | 7 | Bad | Good |
| Example 17 | ε iron oxide | 3.2 | 4.5 | 800 | 6.0 | 5.0 | 0.31 | 0.75 | 0.5 | 90 | 65 | 0.3 | 6.8 | 7.1 | 0.22 | 7 | Good | Good |
| Example 18 | ε iron oxide | 3.2 | 4.5 | 800 | 6.0 | 5.0 | 0.31 | 0.75 | 0.5 | 90 | 73 | 0.3 | 5.7 | 6.2 | 0.48 | 7 | Good | Good |
| Example 19 | ε iron oxide | 3.2 | 4.5 | 800 | 6.0 | 5.0 | 0.31 | 0.75 | 0.5 | 90 | 80 | 0.3 | 5.7 | 6.2 | 0.48 | 8 | Fairly good | Good |
| Example 20 | ε iron oxide | 3.2 | 4.5 | 800 | 6.0 | 5.0 | 0.31 | 5 | 0.5 | 90 | 65 | 0.3 | 5.7 | 6.2 | 0.48 | 8 | Good | Good |
| Example 21 | BaFe | 3.2 | 4.5 | 800 | 6.0 | 5.0 | 0.31 | 0.75 | 0.5 | 90 | 65 | 0.3 | 5.7 | 6.2 | 0.48 | 7 | Good | Good |
| Example 22 | BaFe | 3.2 | 4.5 | 670 | 6.0 | 5.0 | 0.31 | 0.75 | 0.5 | 90 | 65 | 0.3 | 5.7 | 6.2 | 0.50 | 4 | Good | Good |
| Comparative Example 1 | ε iron oxide | 3.8 | 5.5 | 650 | 5.9 | 5.2 | 0.29 | 0.75 | 0.5 | 90 | 65 | 0.6 | 5.2 | 6.2 | 0.48 | 1 | Good | Good |
| Comparative Example 2 | ε iron oxide | 3.2 | 4.5 | 800 | 6.0 | 5.0 | 0.31 | 0.75 | 0.5 | 90 | 65 | 0.3 | 2.8 | 3.9 | 0.88 | 7 | Good | Good |

TABLE 1-continued

| | Magnetic body | Base layer thickness (μm) | $t_T$ (μm) | ΔW (ppm/N) | α (ppm/°C.) | β (ppm/% RH) | ρ | $σ_{MD}$ (N) | V (mm/min) | $t_m$ (nm) | S2 (%) | $t_b$ (μm) | $R_{ab}$ (nm) | $R_{abe}$ (nm) | μ | Rating | Electromagnetic conversion characteristic | Winding deviation |
|---|---|---|---|---|---|---|---|---|---|---|---|---|---|---|---|---|---|---|
| Comparative Example 3 | ε iron oxide | 3.2 | 4.5 | 800 | 6.0 | 5.0 | 0.31 | 0.75 | 0.5 | 90 | 65 | 0.3 | 7.8 | 9.6 | 0.16 | 7 | Bad | Bad |
| Comparative Example 4 | ε iron oxide | 3.2 | 4.5 | 800 | 6.0 | 5.0 | 0.31 | 0.75 | 0.5 | 90 | 65 | 0.3 | 8.8 | 10.5 | 0.14 | 7 | Bad | Bad |
| Comparative Example 5 | BaFe | 4 | 5.7 | 630 | 6.0 | 5.0 | 0.3 | 0.75 | 0.5 | 90 | 65 | 0.6 | 5.7 | 6.2 | 0.50 | 1 | Good | Good |

Note that the symbols in Table 1 mean the following measurement values.

$t_T$: thickness of magnetic tape (unit: μm)

ΔW: dimensional variation of magnetic tape on the width direction to tension change of magnetic tape in the longitudinal direction (unit: ppm/N)

α: thermal expansion coefficient of magnetic tape (unit: ppm/°C.)

β: humidity expansion coefficient of magnetic tape (unit: ppm/% RH)

ρ: Poisson's ratio of magnetic tape $σ_{MD}$: elastic limit value of magnetic tape in the longitudinal direction (unit: N)

V: velocity in the measurement of elastic limit (unit: mm/min)

$t_m$: average thickness of magnetic layer (unit: nm)

S2: squareness ratio of magnetic tape in the thickness direction (vertical direction) (unit: %)

$t_b$: average thickness of back layer (unit: μm)

$R_{ab}$: surface roughness of back layer (unit: nm)

$R_{abe}$: surface roughness of base layer on the back layer side (unit: nm)

μ: interlayer coefficient of friction between the magnetic surface and the back surface The results given in Table 1 indicate the following.

For all of the magnetic tapes of Examples 1 to 22, the grade of the tape width variation was 4 or higher (more specifically alienation from the ideal "effective tape width variation" was small), and the evaluation result of winding deviation was good. Accordingly, it is indicated that the magnetic recording medium according to the present technology is suitable for use in a recording and reproducing apparatus which adjusts the tension in the longitudinal direction, and has good handleability. Contrast between Example 1 and Comparative Example 1 indicates that the magnetic tape of Comparative Example 1 had a dimensional variation Δw of 650 ppm/N and the grade for the tape width variation was 1, while the magnetic tape of Example 1 had a dimensional variation Δw of 705 ppm/N, the grade for the tape width variation was 4. Additionally, comparison between Example 22 and Comparative Example 5 indicates that the magnetic tape of Comparative Example 5 had a dimensional variation Δw of 630 ppm/N, and the grade for the tape width variation was 1, while the magnetic tape of Example 22 had a dimensional variation Δw of 670 ppm/N, and the grade for the tape width variation was 4. Therefore, it is indicated that the magnetic recording tape having a dimensional variation Δw of, for example, 660 ppm/N or more, and preferably 670 ppm/N or more is suitable for use in a recording and reproducing apparatus which adjusts the tension in the longitudinal direction (particularly adjustment of tape width by adjustment of the tension).

The grades for the tape width variation for Examples 1 to 22 indicate that the magnetic recording tape having a dimensional variation ΔW of preferably 700 ppm/N or more, more preferably 750 ppm/N or more, and even more preferably 800 ppm/N or more is more suitable for use in a recording and reproducing apparatus which adjusts the tension in the longitudinal direction (particularly adjustment of tape width by adjustment of the tension). For example, in contrast of Examples 7, 15, and 17 and Comparative Examples 2 to 4, the magnetic recording tapes of three Examples had surface roughness $R_{abe}$ of 4.2 nm≤$R_{abe}$≤8.5 nm, and their evaluation results for winding deviation were good, while the magnetic recording tapes of these three Comparative Examples had surface roughness $R_{abe}$ of less than 4.2 nm or more than 8.5 nm, and their evaluation results for winding deviation were bad. Therefore, it is indicated that, if the surface roughness $R_{abe}$ of the magnetic recording tape is 4.2 nm≤$R_{abe}$≤8.5 nm, the magnetic recording tape has improved handleability.

Additionally, contrast between Examples 7 and 17 indicates that the electromagnetic conversion characteristic improves if the surface roughness $R_{abe}$ is 4.2≤$R_{abe}$≤6.8 (particularly if the surface roughness $R_{abe}$ is 4.2≤$R_{abe}$≤6.8 and the surface roughness $R_{ab}$ is 3.0≤$R_{ab}$≤6.5). The improvement of the electromagnetic conversion characteristic is likely due to the reduction of the influence of the surface roughness of the back surface on the magnetic surface.

Comparison of the evaluation results of Examples 3, 4, 6, and others indicates that the thermal expansion coefficient α is preferably 6 ppm/° C.≤8 ppm/° C., from the viewpoint of suppressing alienation from the ideal "effective tape width variation". Comparison of the evaluation results of Examples 3 to 5 indicates that the humidity expansion coefficient β is preferably β≤5 ppm/% RH, from the viewpoint of suppressing alienation from the ideal "effective tape width variation". Comparison of the evaluation results of Examples 7, 9, 10, and others indicates that the elastic limit value $\sigma_{MD}$ in the longitudinal direction is preferably 0.8 [N]≤$\sigma_{MD}$, from the viewpoint of suppressing alienation from the ideal "effective tape width variation".

Comparison between Examples 9 and 11 indicates that the elastic limit value $\sigma_{MD}$ does not depend on the velocity V in the measurement of elastic limit.

Comparison between the evaluation results of Examples 7, 15, 17, and others indicates that the surface roughness $R_{ab}$ of the back layer is preferably $R_{ab}$6.3 nm, and more preferably $R_{ab}$6.0 nm, from the viewpoint of improvement of the electromagnetic conversion characteristic.

Contrast between Example 7 and Comparative Examples 2 to 4 indicates that the coefficient of friction μ between the magnetic surface and the back surface is preferably 0.20≤μ≤0.83, and particularly preferably 0.20≤μ≤0.80, from the viewpoint of suppressing winding deviation.

Comparison of the evaluation results of Examples 7 and 19 indicates that the squareness ratio S2 of the magnetic tape in the vertical direction is preferably 75% or more, and particularly preferably 80% or more, from the viewpoint of improvement of the electromagnetic conversion characteristic.

Comparison of the evaluation results of Examples 7, 21, and others indicates that the use of barium ferrite nanoparticles as magnetic particles gives evaluation results similar to those obtained by the use of ε-iron oxide nanoparticles as magnetic particles.

Comparison of the results of Example 13 and other examples indicates that the magnetic recording tape of vacuum thin film type (sputtering type) gives evaluation results similar to those of the magnetic recording tapes of coating type.

Comparison of the results of Example 16 and other examples indicates that the average thickness of magnetic layer is preferably 100 nm or less, more preferably 95 nm or less, and particularly preferably 90 nm or less, from the viewpoint of improvement of the electromagnetic conversion characteristic.

Embodiments and examples of the present technology are specifically described above, but the present technology will not be limited to the above embodiments and examples, and may be subjected to various modifications based on the technical thought of the present technology. For example, the configurations, methods, processes, shapes, materials, and values given in the above-described embodiments and examples are only exemplary, and other configurations, methods, processes, shapes, materials, and values different from the above-described ones may be used as necessary. Additionally, chemical formulae such as those of compounds are typical ones, and will not be limited to the valences and others described herein as long as the general name of the same compound is used.

Additionally, the configurations, methods, processes, shapes, materials, and values in the above-described embodiments and examples may be combined with each other without departing from the scope of the present technology.

Additionally, in the present description, the value range indicated using "to" means the range including the values given before and after "to" as the minimum value and the maximum value, respectively. In the value range given in the present description stepwise, the upper limit or lower limit of a value range at one step may be replaced with the upper limit or lower limit of the value range at other step. The materials listed in the present description may be used alone or in combination of two or more, unless otherwise specified.

Note that the present technology may have the following configuration.

[1] A magnetic recording medium including a layer structure including a magnetic layer, a base layer, and a back layer in this order,
in which an average thickness $t_T$ is $t_T \leq 5.5$ μm,
a dimensional variation Δw in a width direction to tension change in a longitudinal direction is 660 ppm/N≤Δw, and
a surface roughness $R_{abe}$ of the base layer on a side of the back layer is 4.2 nm≤$R_{abe}$≤8.5 nm.

[2] The magnetic recording medium according to [1], in which a squareness ratio in a vertical direction is 65% or more.

[3] The magnetic recording medium according to [1] or [2], in which the dimensional variation Δw is 700 ppm/N≤Δw.

[4] The magnetic recording medium according to [1] or [2], in which the dimensional variation Δw is 750 ppm/N≤Δw.

[5] The magnetic recording medium according to [1] or [2], in which the dimensional variation Δw is 800 ppm/N≤Δw.

[6] The magnetic recording medium according to any one of [1] to [5], in which the surface roughness $R_{abe}$ is 4.5 nm≤$R_{abe}$≤8.0 nm.

[7] The magnetic recording medium according to any one of [1] to [5], in which the surface roughness $R_{abe}$ is 4.5 nm≤$R_{abe}$≤7.5 nm.

[8] The magnetic recording medium according to any one of [1] to [5], in which the surface roughness $R_{abe}$ is 5.0 nm≤$R_{abe}$≤7.0 nm.

[9] The magnetic recording medium according to any one of [1] to [8], in which a surface roughness $R_{ab}$ of the back layer is 3.0 nm≤$R_{ab}$7.5 nm.

[10] The magnetic recording medium according to any one of [1] to [9], in which a coefficient of friction μ between a surface of the magnetic recording medium on a side of the magnetic layer and a surface on the side of the back layer is 0.20≤μ≤0.83.

[11] The magnetic recording medium according to any one of [1] to [10],
in which the surface roughness $R_{abe}$ of the base layer on the side of the back layer is 4.2≤$R_{abe}$≤6.8, and
a surface roughness $R_{ab}$ of the back layer is 3.0≤$R_{ab}$≤6.5.

[12] The magnetic recording medium according to any one of [1] to [11],
in which a thermal expansion coefficient α is 6 ppm/° C.≤α≤8 ppm/° C., and
a humidity expansion coefficient β is β≤5 ppm/% RH.

[13] The magnetic recording medium according to any one of [1] to [12], in which a Poisson's ratio ρ is 0.3≤ρ.

[14] The magnetic recording medium according to any one of [1] to [13], in which an elastic limit value $\sigma_{MD}$ in the longitudinal direction is 0.8 N≤$\sigma_{MD}$.

[15] The magnetic recording medium according to [14], in which the elastic limit value $\sigma_{MD}$ does not depend on a velocity V in the measurement of elastic limit.

[16] The magnetic recording medium according to any one of [1] to [15], in which the magnetic layer is vertically oriented.

[17] The magnetic recording medium according to any one of [1] to [16], in which an average thickness $t_b$ of the back layer is $t_b$≤0.6 μm.

[18] The magnetic recording medium according to any one of [1] to [17], in which the magnetic layer is a sputtering layer.

[19] The magnetic recording medium according to [18], in which an average thickness $t_m$ of the magnetic layer is 9 nm≤$t_m$≤90 nm.

[20] The magnetic recording medium according to any one of [1] to [19], in which the magnetic layer includes a magnetic powder.

[21] The magnetic recording medium according to [20], in which the average thickness $t_m$ of the magnetic layer is 35 nm≤$t_m$≤90 nm.

[22] The magnetic recording medium according to [20] or [21], in which the magnetic powder includes an ε-iron oxide magnetic powder, a barium ferrite magnetic powder, a cobalt ferrite magnetic powder, or a strontium ferrite magnetic powder.

[23] The magnetic recording medium according to [2], in which a surface roughness $R_{ab}$ of the back layer is 3.0 nm≤$R_{ab}$≤7.5 nm.

[24] The magnetic recording medium according to [2], in which a coefficient of friction μ between a surface of the magnetic recording medium on a side of the magnetic layer and a surface on the side of the back layer is 0.20≤μ≤0.83.

[25] The magnetic recording medium according to [2], in which the surface roughness $R_{abe}$ of the base layer on the side of the back layer side is 4.2≤$R_{abe}$≤6.8, and a surface roughness $R_{ab}$ of the back layer is 3.0≤$R_{ab}$≤6.5.

[26] The magnetic recording medium according to [2], in which a thermal expansion coefficient α is 6 ppm/° C.≤α≤9 ppm/° C., and
a humidity expansion coefficient β is β≤5.5 ppm/% RH.

[27] The magnetic recording medium according to [2], in which a Poisson's ratio ρ is 0.25≤ρ.

[28] The magnetic recording medium according to [2], in which an elastic limit value $\sigma_{MD}$ in the longitudinal direction is 0.7 N≤$\sigma_{MD}$.

[29] The magnetic recording medium according to [28], in which the elastic limit value $\sigma_{MD}$ does not depend on a velocity V in measurement of elastic limit.

REFERENCE SIGNS LIST

10 Magnetic recording medium
11 Base layer
12 Primary layer
13 Magnetic layer
14 Back layer

The invention claimed is:

1. A magnetic recording medium comprising
a layer structure including a magnetic layer, a base layer, and a back layer in this order,
wherein an average thickness $t_T$ is $t_T \leq 5.5$ μm,
a dimensional variation Δw in a width direction to tension change in a longitudinal direction is 660 ppm/N≤Δw, and
a surface roughness $R_{abe}$ of the base layer on a side of the back layer is 4.2 nm≤$R_{abe}$≤8.5 nm, and
wherein the dimensional change amount Δw is determined according to:

$$\Delta w [ppm/N] = \frac{D(0.2N)[mm] - D(1.0N)[mm]}{D(0.2N)[mm]} \times \frac{1{,}000{,}000}{(1.0[N]) - (0.2[N])}$$

where D(0.2N) and D(1.0N) represent widths of a sample of the magnetic recording medium subject to loads of 0.2N and 1.0N, respectively, in the longitudinal direction.

2. The magnetic recording medium according to claim 1, wherein a squareness ratio in a vertical direction is 65% or more.

3. The magnetic recording medium according to claim 1, wherein the dimensional variation Δw is 700 ppm/N≤Δw.

4. The magnetic recording medium according to claim 1, wherein the dimensional variation Δw is 750 ppm/N≤Δw.

5. The magnetic recording medium according to claim 1, wherein the dimensional variation Δw is 800 ppm/N≤Δw.

6. The magnetic recording medium according to claim 1, wherein the surface roughness $R_{abe}$ is 4.5 nm≤$R_{abe}$≤8.0 nm.

7. The magnetic recording medium according to claim 1, wherein the surface roughness $R_{abe}$ is 4.5 nm≤$R_{abe}$≤7.5 nm.

8. The magnetic recording medium according to claim 1, wherein the surface roughness $R_{abe}$ is 5.0 nm≤$R_{abe}$≤7.0 nm.

9. The magnetic recording medium according to claim 1, wherein a surface roughness $R_{ab}$ of the back layer is 3.0 nm≤$R_{ab}$≤7.5 nm.

10. The magnetic recording medium according to claim 1, wherein a coefficient of friction μ between a surface of the magnetic recording medium on a side of the magnetic layer and a surface on the side of the back layer is 0.20≤μ≤0.83.

11. The magnetic recording medium according to claim 1, wherein the surface roughness $R_{abe}$ of the base layer on the side of the back layer is 4.2≤$R_{abe}$≤6.8, and
a surface roughness $R_{ab}$ of the back layer is 3.0≤$R_{ab}$≤6.5.

12. The magnetic recording medium according to claim 1, wherein a thermal expansion coefficient α is 6 ppm/° C.≤α≤9 ppm/° C., and
a humidity expansion coefficient β is β≤5.5 ppm/% RH.

13. The magnetic recording medium according to claim 1, wherein a Poisson's ratio ρ is 0.25≤ρ.

14. The magnetic recording medium according to claim 1, wherein an elastic limit value $\sigma_{MD}$ in the longitudinal direction is 0.7 N≤$\sigma_{MD}$, and wherein the elastic limit value $\sigma_{MD}$ is determined by pulling a sample of the magnetic recording medium at 0.5 mm/min to obtain a distance versus load relationship.

15. The magnetic recording medium according to claim 14, wherein the elastic limit value $\sigma_{MD}$ does not depend on a velocity V in measurement of elastic limit.

16. The magnetic recording medium according to claim 1, wherein the magnetic layer is vertically oriented.

17. The magnetic recording medium according to claim 1, wherein an average thickness $t_b$ of the back layer is $t_b$≤0.6 μm.

18. The magnetic recording medium according to claim 1, wherein the magnetic layer is a sputtering layer.

19. The magnetic recording medium according to claim 18, wherein an average thickness $t_m$ of the magnetic layer is 9 nm≤$t_m$≤90 nm.

20. The magnetic recording medium according to claim 1, wherein the magnetic layer includes a magnetic powder.

21. The magnetic recording medium according to claim 20, wherein the average thickness $t_m$ of the magnetic layer is 35 nm≤$t_m$≤120 nm.

22. The magnetic recording medium according to claim 20, wherein the magnetic powder includes an ε-iron oxide magnetic powder, a barium ferrite magnetic powder, a cobalt ferrite magnetic powder, or a strontium ferrite magnetic powder.

23. The magnetic recording medium according to claim 2, wherein a surface roughness $R_{ab}$ of the back layer is 3.0 nm≤$R_{ab}$≤7.5 nm.

24. The magnetic recording medium according to claim 2, wherein a coefficient of friction μ between a surface of the magnetic recording medium on a side of the magnetic layer and a surface on the side of the back layer is 0.20≤μ≤0.83.

25. The magnetic recording medium according to claim 2, wherein the surface roughness $R_{abe}$ of the base layer on the side of the back layer is 4.2≤$R_{abe}$≤6.8, and
a surface roughness $R_{ab}$ of the back layer is 3.0≤$R_{ab}$≤6.5.

26. The magnetic recording medium according to claim 2, wherein a thermal expansion coefficient α is 6 ppm/° C.≤α≤9 ppm/° C., and
a humidity expansion coefficient β is β≤5.5 ppm/% RH.

27. The magnetic recording medium according to claim 2, wherein a Poisson's ratio ρ is 0.25≤ρ.

28. The magnetic recording medium according to claim 2, wherein an elastic limit value $\sigma_{MD}$ in the longitudinal direction is 0.7 N≤$\sigma_{MD}$, and wherein the elastic limit value $\sigma_{MD}$ is determined by pulling a sample of the magnetic recording medium at 0.5 mm/min to obtain a distance versus load relationship.

29. The magnetic recording medium according to claim 28, wherein the elastic limit value $\sigma_{MD}$ does not depend on a velocity V in measurement of elastic limit.

* * * * *